(12) United States Patent
Rathonyi et al.

(10) Patent No.: US 10,798,773 B2
(45) Date of Patent: *Oct. 6, 2020

(54) METHOD FOR CONTROLLING CONNECTED MODE DRX OPERATIONS

(71) Applicant: TELEFONAKTIEBOLAGET LM ERICSSON (PUBL), Stockholm (SE)

(72) Inventors: Béla Rathonyi, Lomma (SE); Ali Nader, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/908,007

(22) Filed: Feb. 28, 2018

(65) Prior Publication Data

US 2018/0192469 A1    Jul. 5, 2018

Related U.S. Application Data

(63) Continuation of application No. 15/403,614, filed on Jan. 11, 2017, now Pat. No. 9,942,941.

(Continued)

(51) Int. Cl.
*H04W 76/28* (2018.01)
*H04W 52/02* (2009.01)
(Continued)

(52) U.S. Cl.
CPC ........... *H04W 76/28* (2018.02); *H04L 1/1812* (2013.01); *H04L 5/0055* (2013.01); *H04L 69/28* (2013.01);
(Continued)

(58) Field of Classification Search
CPC ............... H04W 76/048; H04W 71/14; H04W 72/1278; H04W 76/068; H04W 29/06993;
(Continued)

(56) References Cited

U.S. PATENT DOCUMENTS 9,402,229 B2  7/2016  Wang et al.
9,504,083 B2  11/2016  Tseng
(Continued)

FOREIGN PATENT DOCUMENTS

MX    2010/010030 A   12/2010
RU    2497280 C2      10/2013
(Continued)

OTHER PUBLICATIONS

Samsung: "DRX enhancements for Rel-13 low complexity MTC", 3GPP Draft; R2-156262, 3rd Generation Partnership Project (3GPP), Mobile Competence Centre; 650, Route Des Lucioles; F-06921 Sophia-Antipolis Cedex; France vol. RAN WG2, No. Anaheim, USA; Nov. 16, 2015-Nov. 20, 2015 Nov. 16.

(Continued)

*Primary Examiner* — Warner Wong

(57) ABSTRACT

A method in a UE comprises monitoring a downlink control channel during a duration of at least a first timer, and receiving an indication of a downlink or uplink transmission for the UE. The method comprises after receiving the indication of the downlink or uplink transmission for the UE, stopping monitoring the first timer, wherein after the first timer is stopped the UE does not need to monitor the downlink control channel. The method comprises performing an uplink transmission associated with the indicated downlink or uplink transmission for the UE. The method comprises starting a second timer after receiving the indication for the downlink or uplink transmission for the UE, the duration of the second timer comprising an offset period, and, when the second timer expires, starting a third timer. The UE monitors the downlink control channel for the duration of the third timer.

26 Claims, 21 Drawing Sheets

Related U.S. Application Data

(60) Provisional application No. 62/277,202, filed on Jan. 11, 2016.

(51) Int. Cl.

| | | |
|---|---|---|
| *H04L 1/18* | (2006.01) | |
| *H04L 5/00* | (2006.01) | |
| *H04L 29/06* | (2006.01) | |
| *H04W 72/14* | (2009.01) | |
| *H04W 72/12* | (2009.01) | |

(52) U.S. Cl.
CPC ....... *H04W 52/0216* (2013.01); *H04W 72/14* (2013.01); *H04L 1/1851* (2013.01); *H04L 1/1883* (2013.01); *H04W 72/1278* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/23* (2018.01); *Y02D 70/24* (2018.01); *Y02D 70/25* (2018.01)

(58) Field of Classification Search
CPC ... H04L 5/0055; H04L 1/1812; H04L 1/1851; H04L 1/1883; H04L 69/28
See application file for complete search history.

(56) References Cited

U.S. PATENT DOCUMENTS

| | | | | |
|---|---|---|---|---|
| 2011/0205928 | A1* | 8/2011 | Pelletier | ................ H04L 1/1883 370/252 |
| 2011/0294491 | A1* | 12/2011 | Fong | ....................... H04L 5/001 455/422.1 |
| 2012/0201151 | A1* | 8/2012 | Kubota | ................. H04L 1/1851 370/252 |
| 2015/0043494 | A1 | 2/2015 | Kim et al. | |
| 2015/0263846 | A1 | 9/2015 | Lee et al. | |
| 2015/0359034 | A1 | 12/2015 | Kim et al. | |
| 2016/0254901 | A1 | 9/2016 | You et al. | |
| 2020/0052830 | A1* | 2/2020 | Liu | ..................... H04W 72/042 |
| 2020/0128574 | A1* | 4/2020 | Suzuki | ................. H04W 76/27 |

FOREIGN PATENT DOCUMENTS

| | | |
|---|---|---|
| WO | 2014/025211 A1 | 2/2014 |
| WO | 2015/130005 A1 | 9/2015 |
| WO | 2015/173197 A | 11/2015 |

OTHER PUBLICATIONS

Neul: "DRX in RRC_Connected", 3GPP Draft; R2-156506 DRX in RRC_Connected_V1, 3rd Generation Partnership Project (3GPP), Mobile Competence Centre; 650, Route Des Lucioles; F-06921 Sophia-Antipolis Cedex; France.

"3rd Generation Partnership Project; Technical Specification Group Radio Access Network; Evolved Universal Terrestrial Radio Access (EUTRA); Medium Access Control (MAC) protocol specification (Release 13)", 3GPP Draft; Draft_36321-Doo_With_Rev_Marks, 3rd,3GPP TS 36.321 V13.0.0 (Dec. 2015).

R2-156137, HARQ principles for NB-IoT, Ericsson, RAN2#92, Nov. 2015.

R2-160427, Scheduling and HARQ principles for NB-IoT, Ericsson, RAN2 NB-IoT ad-hoc, (to be published Jan. 12, 2016).

R2-156766, LG Electronics Inc., DRX related timers handling, 3GPP TSG-RAN WG2#92, Nov. 7, 2015.

\* cited by examiner

METHOD FOR CONTROLLING CONNECTED MODE DRX OPERATIONS

PRIORITY

This application is a continuation of co-pending U.S. patent application Ser. No. 15/403,614 filed Jan. 11, 2017 which claims benefit of U.S. Patent Provisional Application No. 62/277,202 filed on Jan. 11, 2016, the disclosure of which is hereby incorporated by reference.

TECHNICAL FIELD

The present disclosure relates, in general, to wireless communications and, more particularly, to methods for controlling connected mode discontinuous reception operations.

BACKGROUND

Narrow Band Internet-of-Things (NB-IoT) is a narrowband (180 KHz bandwidth) system being developed for cellular Internet-of-Things (IoT) by the Third Generation Partnership Project (3GPP). The system is based on Long Term Evolution (LTE) systems, and addresses optimized network architecture and improved indoor coverage for a massive number of devices with any of the following characteristics: low throughput (e.g., 2 Kbps); low delay sensitivity (e.g., ~10 seconds); ultra-low device cost (e.g., below 5 dollars); and low device power consumption (e.g., battery life of 10 years).

It is envisioned that each cell (e.g., ~1 Km$^2$) in this system will serve thousands (e.g., ~50,000) devices such as sensors, meters, actuators, and other devices. It is imperative that this system be able to provide good coverage for its devices, which are often located deep indoors (e.g., underground in basements, or even built into walls of a building) and have limited or no possibility for battery charging. Although many different types of devices are envisioned, for the sake of simplicity they will be interchangeably referred to herein as user equipment (UEs) or wireless devices.

In order to make it possible to deploy NB-IoT using only one re-farmed GSM carrier and support lower manufacturing costs for NB-IoT UEs, the bandwidth has been reduced to one physical resource block (PRB) of size 180 KHz divided into several subcarriers.

For frequency division duplex (FDD) (i.e., the transmitter and the receiver operate at different carrier frequencies), only half-duplex mode needs to be supported in the UE. The lower complexity of the devices (e.g., only one transmission/receiver chain) means that some repetition might also be needed in normal coverage. Further, to alleviate UE complexity, the working assumption is to have cross-subframe scheduling. That is, a transmission is first scheduled on an Enhanced Physical Downlink Control Channel (E-PDCCH, also known as narrowband Physical Downlink Control Channel (NB-PDCCH or NPDCCH). Then, the first transmission of the actual data on the narrowband Physical Downlink Shared Channel (NB-PDSCH or NPDSCH) is carried out after the final transmission of the NB-PDCCH. Similarly, for uplink (UL) data transmission, information about resources scheduled by the network and needed by the UE for UL transmission is first conveyed on the NB-PDCCH and then the first transmission of the actual data by the UE on the narrowband Physical Uplink Shared Channel (NB-PUSCH or NPUSCH) is carried out after the final transmission of the NB-PDCCH. In other words, for both cases above, there is no simultaneous reception of control channel and reception/transmission of data channel from the UE's perspective.

In legacy cellular communication systems like High Speed Packet Access (HSPA) and LTE, a re-transmission procedure called Hybrid Automatic Repeat reQuest (HARQ) with soft combining is supported. After a data block is transmitted in one direction (e.g., between a UE and a radio base station) feedback on the decoding result is usually transmitted in the reverse direction, denoted as a HARQ feedback message. This feedback message is typically either a "binary" decoding result or a scheduling grant/assignment message. In cases where the feedback is a "binary" decoding result, the feedback may be in the form of an acknowledgement (ACK) indicating that data block decoding was successful, or a negative acknowledgement (NACK) indicating that data block decoding was unsuccessful. In cases where the feedback is in the form of a scheduling grant/assignment message, the scheduling grant/assignment message may request either a re-transmission (in the event that data block decoding is unsuccessful, similar to the NACK described above) or a transmission of a new data block that implicitly acknowledges that the previous data block was successfully decoded (similar to the ACK described above).

In some cases, HARQ feedback information could also be indicated by no transmission (DTX). In such a scenario, no transmission means either ACK or NACK (typically the latter) and transmitting something (e.g., a preamble or some other signal/code) could indicate an ACK. Lack of transmitting a HARQ feedback message could also be possible to indicate either a successful or unsuccessful decoded data block (i.e., ACK or NACK). The HARQ feedback (or lack of it) then triggers the re-transmission, or, if the data was received successfully and more data is available, a new data transmission could be started.

Typically, multiple so-called HARQ processes are used in parallel (e.g., in HSPA and LTE). A HARQ process is a stop-and-wait (SAW) HARQ entity that independently transfers data packets and waits for HARQ feedback before either a re-transmission or a new transmission is transmitted. In legacy LTE FDD, typically eight HARQ processes are supported per direction. The same applies to HSPA with 2 ms UL transmission time interval (TTI).

Synchronous HARQ operation means the retransmissions occur at a fixed time after the previous transmission. In asynchronous HARQ operation, on the other hand, the retransmissions can occur at any time after a previous transmission. In both legacy LTE and in HSPA, the UL uses synchronous HARQ and the downlink (DL) uses asynchronous HARQ.

To reduce UE battery consumption, a concept called connected mode discontinuous reception (DRX) is used, which allows the UE to go into sleep mode (i.e., no reception and/or transmission is required) during connected mode in LTE. The main idea is that when there has not been any transmission and/or reception activity (e.g., no transmissions/re-transmissions and no pending re-transmissions) for a period of time, the UE can go into sleep mode and only needs to be awake periodically for a short amount of time every DRX cycle to monitor the DL control channel. If new UL data becomes available, the UE can wake up at any time but needs to inform the network through configured UL resources (for example, a scheduling request could be triggered to be sent on Physical Uplink Control Channel (PUCCH)).

The DRX operation is defined in 3GPP TS 36.321, v. 13.0.0 for legacy LTE and controlled by a set of timers/ parameters that are either pre-defined or sent to the UE. Specifically: onDurationTimer; drxStartOffset (from longDRX-CycleStartOffset in 3GPP TS 36.331, v. 13.0.0); longDRX-Cycle (from longDRX-CycleStartOffset in 3GPP TS 36.331, v. 13.3.0); shortDRX-Cycle; drxShortCycleTimer; drx-InactivityTimer; HARQ-RTT-Timer; and drx-RetransmissionTimer. Herein, citations to a particular version of the standard (e.g., TS 36.331, v. 13.0.0) are intended as representative versions available when the application was originally filed. However, other versions may also apply, as appropriate.

FIG. 1 illustrates an example of UE operation during connected mode DRX. More particularly, FIG. 1 (which is reproduced from 3GPP TS 36.321, v. 13.0.0) illustrates when the UE needs to be awake and monitor the DL control channel (denoted as PDCCH in the example of FIG. 1, but could be PDCCH and/or ePDCCH) during connected mode DRX cycle 105. In general, during DRX cycle 105 the UE monitors the DL control channel during OnDuration period 110 and sleeps during Opportunity for DRX 115. If new data is scheduled (in either UL or DL) during the OnDuration time 105, the UE goes out of DRX and starts a timer called drx-InactivityTimer.

FIG. 2 illustrates an example of legacy DRX operation. If new data 205 is scheduled (by DL control channel 210), drx-InactivityTimer 215 will be re-started, otherwise it will eventually expire and the UE enters DRX. In the example of FIG. 2, the UE enters DRX upon expiry of drx-InactivityTimer 215 if it has not detected PDCCH during the duration of drx-InactivityTimer 215. In addition, FIG. 2 illustrates the offset 220 between the HARQ data 205 (shown in the example of FIG. 2 as "New Data" 205) and the HARQ feedback 225 (shown in FIG. 2 as ACK transmission 225 in the UL 230). In LTE, offset between the HARQ data 205 and the HARQ feedback 225 is always N+4, i.e., always 4 ms (or equivalently sub-frames) after the data transmission at time occasion N.

FIG. 3 illustrates an example of legacy DRX operation if there are DL re-transmissions. In such a scenario, the UE uses two other timers: HARQ-RTT-Timer 305 and drx-RetransmissionTimer 310 to supervise the re-transmission(s). Note that these timers are independent of drx-InactivityTimer 215. When the re-transmission (shown in FIG. 3 as ReTx 315) is successfully decoded, drx-RetransmissionTimer 310 is stopped/cancelled, as shown in the example of FIG. 3. Note that in the example of FIG. 3, after "New Data" 205 there could be activity for other UL/DL HARQ processes signaled on the PDCCH. If new data is scheduled on any of those, drx-InactivityTimer 215 is re-started.

FIG. 4 illustrates an example of legacy DRX operation when there is an UL re-transmission. In the example of FIG. 4, the UE receives UL grant 405 on DL control channel 410 while OnDuration Timer 410 is running. Upon receiving UL grant 405, the UE stops OnDuration Timer 410 and starts drx-InactivityTimer 215. In the example of FIG. 4, the UE performs UL transmission 420 (shown as "New Data" in the example of FIG. 4) associated with UL grant 405. After performing the UL transmission 420, the UE will enter DRX upon expiry of drx-InactivityTimer 215 if it does not detected PDCCH during the duration of drx-InactivityTimer 215.

In legacy LTE, no retransmission timers are needed if there is an UL re-transmission 425, as synchronous HARQ is used. Synchronous HARQ provides the exact timing on when the HARQ feedback (e.g., ACK 435 and/or NACK 430) and the re-transmission is scheduled. A new grant on DL control channel 410 (e.g., PDCCH) could also be given at the same sub-frame as NACK 430 is sent on the Physical Hybrid Indicator Channel (PHICH) and then the re-transmission is called "adaptive." The N+4 offsets between UL grant 405 and UL transmission 420, between uplink transmission 420 and NACK 430, between NACK 430 and UL retransmission 425, and between UL retransmission 425 and ACK 435 are shown as elements 220a, 220b, 220c, and 220d, respectively.

Note that in the example of FIG. 4, after UL grant 405 there could be activity for other UL/DL HARQ processes signaled on downlink control channel 410 (e.g., PDCCH). If new data is scheduled on any of those, the drx-InactivityTimer is re-started (if used/running). Note, also that in some cases ACK 435 could also be an implicit acknowledgement, for example if a grant for new data is given for the HARQ process.

In 3GPP Release 13, a work item for enhanced Machine-Type Communication (eMTC) has been ongoing, in which changes have been made to HARQ operations as compared to legacy LTE. It has been decided that three parallel HARQ processes are supported. In addition, the UL HARQ has been changed from synchronous to asynchronous, and HARQ feedback is only implicit and received on M-PDCCH (i.e., no PHICH channel exists) earliest N+4 after the PUSCH transmission. As a result, changes are needed to how the UE should enter DRX when there is a re-transmission, as the timing of the HARQ feedback is no longer fixed.

In another work item in 3GPP Release 13 related to licensed-assisted access (LAA), it has also been identified that the UL HARQ needs to be changed from synchronous to asynchronous compared to legacy LTE. The impact of this is described in detail in 3GPP TR 36.889, v. 13.0.0 (and in particular section 7.2.2.2), which is hereby incorporated by reference in its entirety.

In LTE/eMTC all DRX parameters are semi-statically configured in the UE based on Radio Resource Control (RRC) signaling. Some dynamic change is supported through Medium Access Control (MAC) signaling to control the UE entering short/long DRX during the "Active time."

A problem with existing approaches is that the HARQ/DRX design has been optimized for multiple HARQ processes and use cases where low latency is important and minimizing UE battery consumption has not been the main goal. If the same design is applied to a UE that only supports half-duplex operations, cross subframe scheduling and only one HARQ process, it would result in the UE being awake for a longer time than necessary for many traffic use cases that are typically used in MTC/IoT applications. For example, in many of the traffic use cases there are no simultaneous UL and DL data transfers. Instead, most use cases rely on a request-response type of traffic pattern where an IP packet is sent in one direction followed by a response in the other.

Further, according to existing approaches (both LTE and HSPA) the HARQ operation in the UL is synchronous. If the HARQ operation is changed to asynchronous, it is not known how long the UE shall wait for HARQ feedback after a transmission/re-transmission has been done. One approach would be to copy the DL design also for the UL (i.e., introduce similar timers (e.g., HARQ-RTT-Timer/drx-RetransmissionTimer) also for the UL). Although such an approach might be acceptable for legacy LTE use cases, it is not well suited for use cases in the area of MTC/IoT. These applications involve the use of new, simplified UEs with support for only half-duplex, one HARQ process and cross-subframe scheduling. Thus, a more optimized solution is desirable. The reason for this is that other solutions could reduce the UE battery/power consumption and therefore perform better if the properties of half-duplex, one HARQ process, only cross sub-frame scheduling and typical traffic patterns are utilized in the design.

One goal of NB-IoT is to re-use the legacy LTE (including eMTC changes) as much as possible. An important consideration is how the HARQ and connected mode DRX operations should work. If the legacy design is applied on NB-IoT this would lead to larger battery/power consumption for the UE. Further, since all the DRX-related timers are semi-static, there is very limited flexibility for the eNB to schedule HARQ transmissions/re-transmissions and HARQ feedbacks. If many UEs and/or UEs with different coverage levels (and thus different transmission duration times) need to be served, the previous approaches of having semi-static parameters are not flexible enough to enable short "active time" for UEs. Applying the same design as in legacy LTE would require the use of larger timer values, and thus the UE awake time would be longer resulting in larger battery/power consumption.

SUMMARY

To address the foregoing problems with existing solutions, disclosed is a method in a user equipment (UE). The method comprises monitoring a downlink control channel during a duration of at least a first timer. The method comprises receiving, on the monitored downlink control channel, an indication of a downlink or uplink transmission for the UE. The method comprises after receiving the indication of the downlink or uplink transmission for the UE, stopping monitoring the first timer, wherein after the first timer is stopped the UE does not need to monitor the downlink control channel. The method comprises performing an uplink transmission associated with the indicated downlink or uplink transmission for the UE. The method comprises starting a second timer, after receiving the indication of the downlink or uplink transmission for the UE, the duration of the second timer comprising an offset period. The method comprises when the second timer expires, starting a third timer, wherein the UE monitors the downlink control channel for the duration of the third timer.

In certain embodiments, the second timer may be started either: after performing the associated uplink transmission; or at the end of the received indication of the downlink or uplink transmission for the UE.

In certain embodiments, the method may comprise entering a discontinuous reception mode when the third timer expires. The method may comprise receiving a message including information about a duration of at least one of the second and third timers. In certain embodiments, the first timer may be an onDurationTimer of a discontinuous reception cycle. In certain embodiments, at least one of the first timer and the third timer may be a drx-InactivityTimer. In certain embodiments, at least one of the first timer and the third timer may comprise a discontinuous reception retransmission timer. In certain embodiments, the second timer may be a Hybrid Automatic Repeat reQuest (HARQ)-Round Trip Time (RTT) timer that comprises the offset period.

In certain embodiments, the indication of the downlink or uplink transmission for the UE may comprise a downlink scheduling assignment, and the uplink transmission associated with the indicated downlink transmission may comprise an acknowledgement message. In certain embodiments, the indication of the downlink or uplink transmission for the UE may comprise an uplink grant, and the uplink transmission associated with the indicated uplink transmission may comprise a data transmission in the uplink. In certain embodiments, the indication of the downlink or uplink transmission for the UE may comprise information about a duration of at least one of the second and third timers.

Also disclosed is a user equipment (UE). The UE comprises processing circuitry. The processing circuitry is configured to monitor a downlink control channel during a duration of at least a first timer. The processing circuitry is configured to receive, on the monitored downlink control channel, an indication of a downlink or uplink transmission for the UE. The processing circuitry is configured to, after receiving the indication of the downlink or uplink transmission for the UE, stop monitoring the first timer, wherein after the first timer is stopped, the UE does not need to monitor the downlink control channel. The processing circuitry is configured to perform an uplink transmission associated with the indicated downlink or uplink transmission for the UE. The processing circuitry is configured to start a second timer after receiving the indication of the downlink or uplink transmission for the UE, the duration of the second timer comprising an offset period. The processing circuitry is configured to, when the second timer expires, start a third timer, wherein the UE monitors the downlink control channel for the duration of the third timer.

Also disclosed is a method in a network node. The method comprises determining a duration of a first timer and a duration of a second timer, the first and second timers for use by a user equipment (UE) to control discontinuous reception operation, wherein the duration of the first timer comprises an offset period. The method comprises sending, to the UE, information about the duration of the first timer and the duration of the second timer.

In certain embodiments, sending, to the UE, information about the duration of the first timer and the duration of the second timer may comprise sending a message to the UE including the information about the duration of the first timer and the duration of the second timer.

In certain embodiments, the information about the duration of the first timer and the duration of the second timer may be included in an indication of a downlink or uplink transmission for the UE. The method may comprise sending, to the UE, an indication of a downlink or uplink transmission for the UE, and receiving, from the UE, an uplink transmission associated with the indicated downlink or uplink transmission for the UE. In certain embodiments, the indication of the downlink or uplink transmission for the UE may comprise a downlink scheduling assignment, and the uplink transmission associated with the indicated downlink transmission may comprise an acknowledgement message. In certain embodiments, the indication of the downlink or uplink transmission for the UE may comprise an uplink grant, and the uplink transmission associated with the indicated uplink transmission may comprise a data transmission in the uplink.

In certain embodiments, the duration of the first timer comprises one of: an amount of time that the UE waits after sending the uplink transmission associated with the indicated downlink or uplink transmission for the UE before the UE starts the second timer; and an amount of time that the UE waits after the end of the indication of the downlink or uplink transmission for the UE before the UE starts the second timer. In certain embodiments, the first timer may be a Hybrid Automatic Repeat reQuest (HARQ)-Round Trip Time (RTT) timer. In certain embodiments, the duration of the second timer may comprise an amount of time that the UE monitors a downlink control channel before entering a discontinuous reception mode. In certain embodiments, the second timer may be a drx-InactivityTimer.

Also disclosed is a network node. The network node comprises processing circuitry. The processing circuitry is configured to determine a duration of a first timer and a duration of a second timer, the first and second timers for use by a user equipment (UE) to control discontinuous reception operation, wherein the duration of the first timer comprises an offset period. The processing circuitry is configured to send, to the UE, information about the duration of the first timer and the duration of the second timer.

Certain embodiments of the present disclosure may provide one or more technical advantages. For example, certain embodiments may advantageously reduce UE battery and/or power consumption compared to existing approaches. As another example, certain embodiments may advantageously reduce the time the UE needs to be awake to monitor the downlink control channel. As still another example, the amount of time the UE needs to be awake to monitor the downlink control channel can be adapted to the present scheduling situation in the network node (for example, an eNB). As yet another example, because the downlink control channel in NB-IoT needs to be time multiplexed both between UEs and with transmissions on the downlink shared channel, certain embodiments may advantageously enable time multiplexing of the "active time" for UEs, which may increase scheduling flexibility in the network node and allow the UEs to be awake during smaller (i.e., shorter time durations). Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
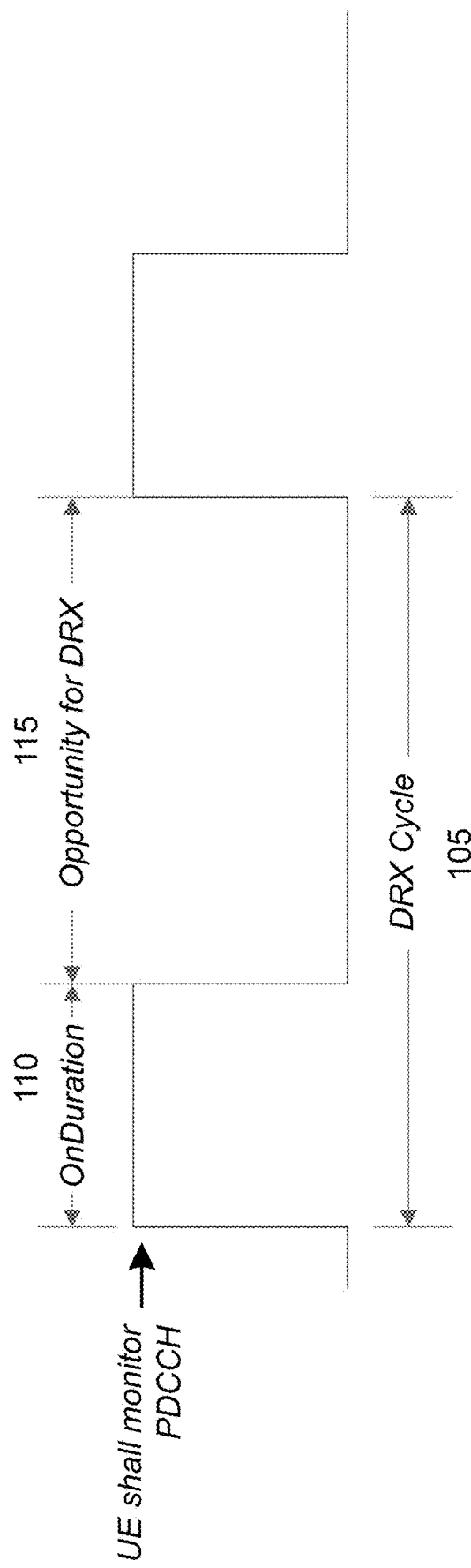
FIG. 1 illustrates an example of UE operation during connected mode DRX.
Figure 2:
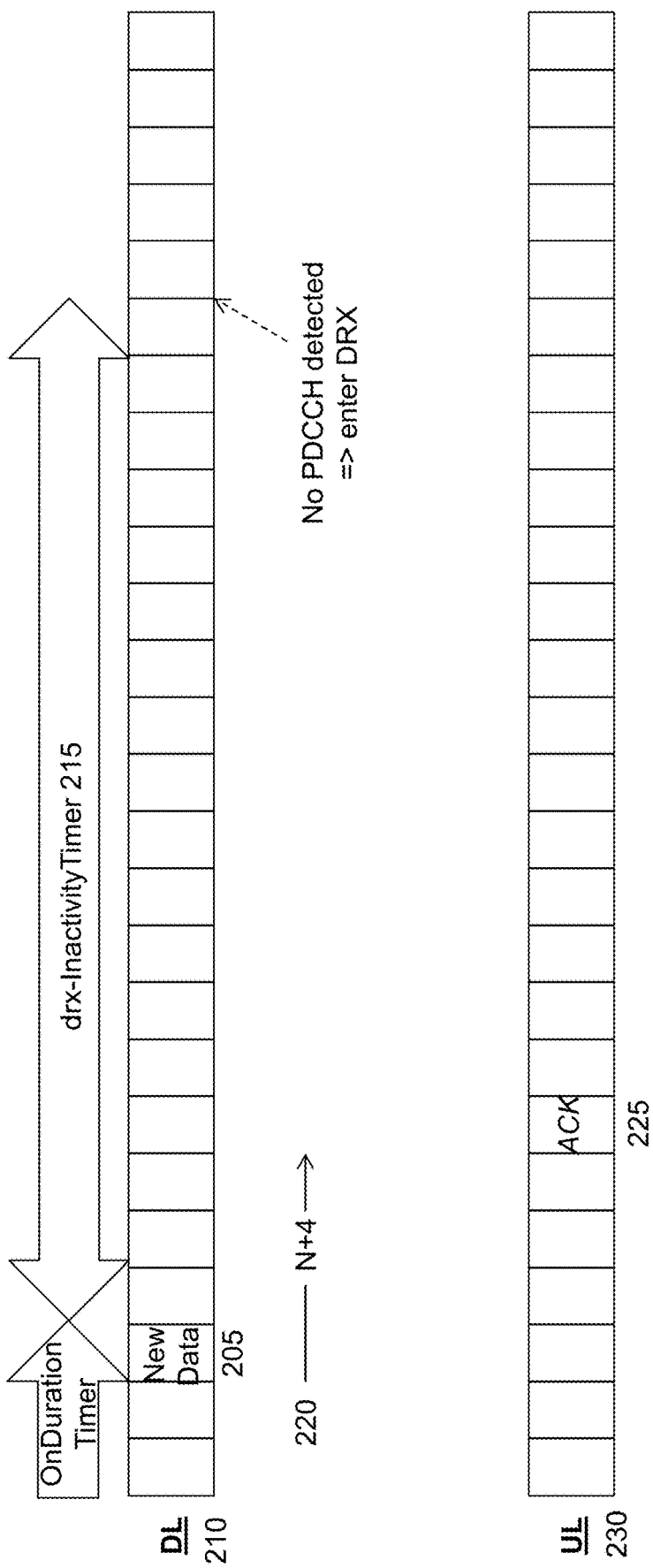
FIG. 2 illustrates an example of legacy DRX operation.
Figure 3:
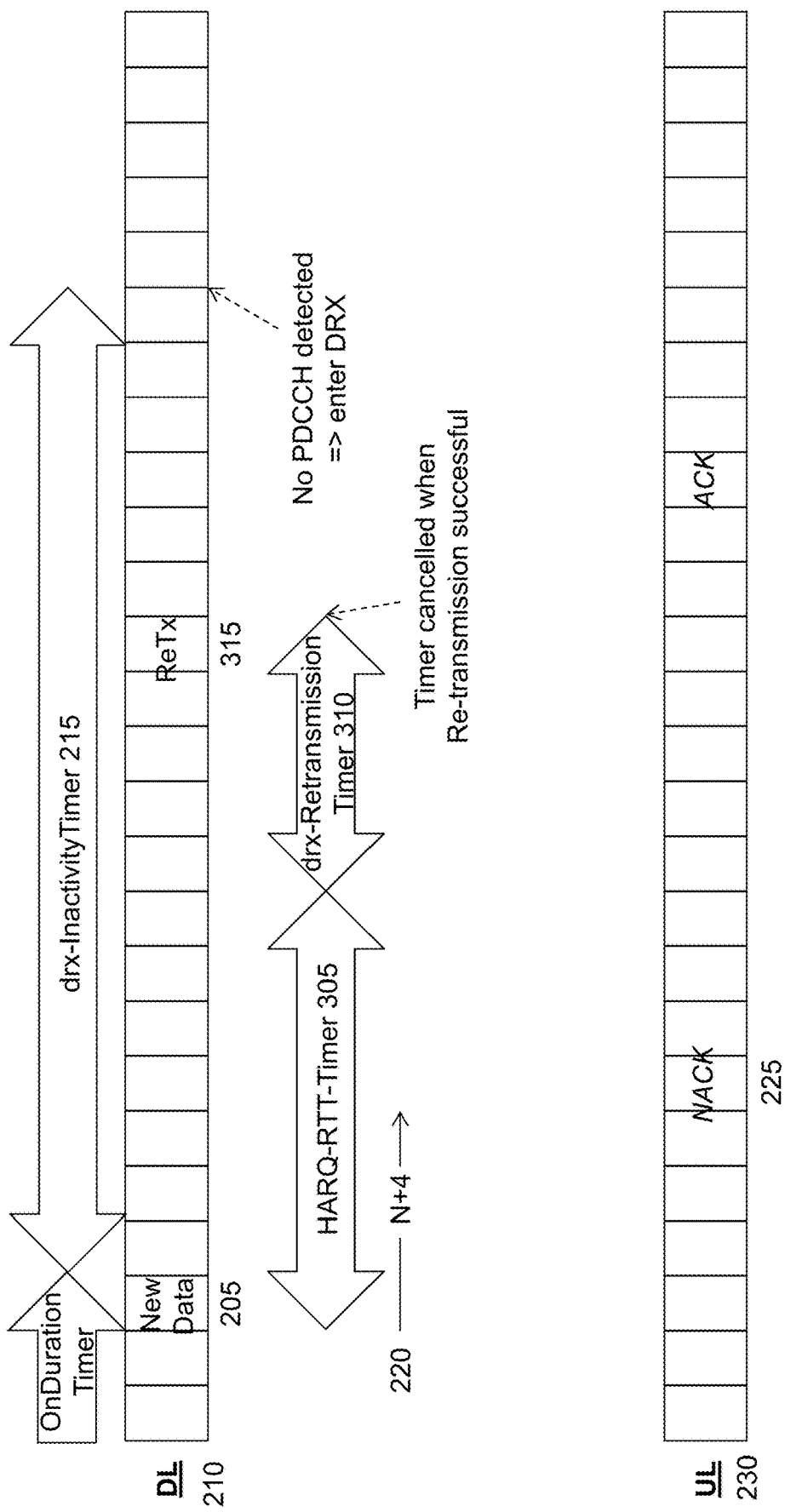
FIG. 3 illustrates an example of legacy DRX operation if there are DL re-transmissions.
Figure 4:
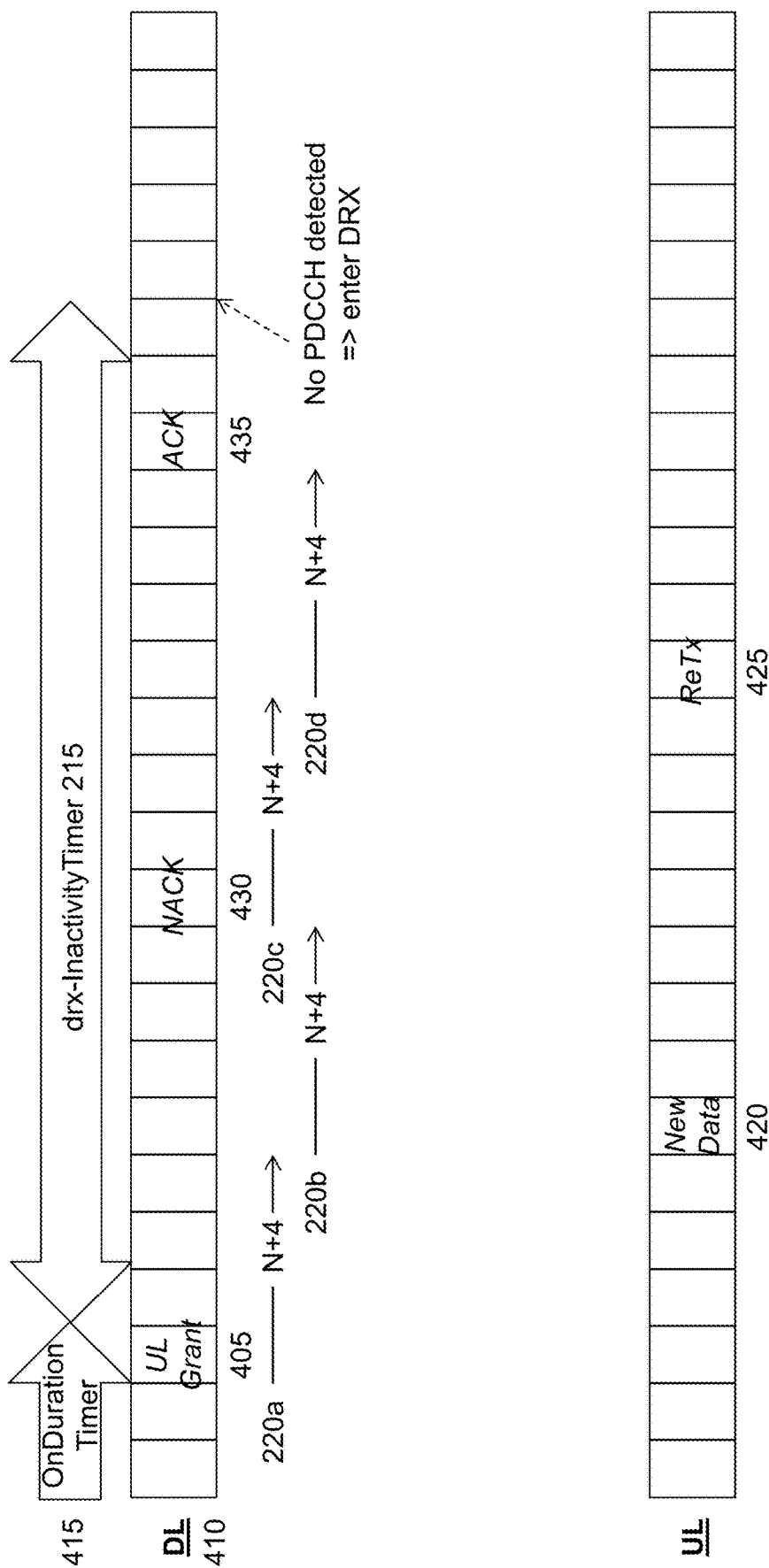
FIG. 4 illustrates an example of legacy DRX operation when there is an UL re-transmission.

As described above, one important consideration is how the HARQ and connected mode DRX operations should work in NB-IoT. Existing approaches, such as those used in legacy LTE, are not acceptable for the use cases associated with NB-IoT operations. For example, if the legacy design is applied on NB-IoT, this would lead to larger battery and/or power consumption for the UE. Furthermore, since all the DRX-related timers are semi-static, there is very limited flexibility for the eNB to schedule HARQ transmissions/re-transmissions and HARQ feedbacks. If many UEs and/or UEs with different coverage levels (and thus different transmission duration times) need to be served, the existing approaches having semi-static parameters are not flexible enough to enable short "Active time" for UEs. Applying the existing approaches used in legacy LTE to NB-IoT use cases would therefore necessitate the use of larger timer values, which would have the undesirable consequence of increasing the amount of time the UE is required to be awake and, in turn, result in larger battery and/or power consumption by the UE.

The present disclosure contemplates various embodiments that may address these and other deficiencies associated with existing approaches. In certain embodiments, the deficiencies associated with existing approaches may be overcome using a new, flexible way of handling/controlling the "active time" (i.e., the time a UE needs to be awake to monitor a DL control channel) in connected mode for NB-IoT. Generally, two parameters may be used for this: an "active time" that determines how long the UE should be awake to monitor the DL control channel before going into DRX; and an "offset time" that determines when to start the "active time." In some cases, the "offset time" is set relative to an UL transmission that was triggered by receiving a control message on the DL control channel (e.g., NB-PDCCH). In one non-limiting example, the UL transmission may be either a HARQ feedback message associated with a DL assignment for receiving DL data or an UL grant resulting in an UL transmission of UL data. If a new control message is received on the DL control channel during the "active time," the "active time" is stopped (i.e., the UE does not need to be awake to monitor the DL control channel).

Then, the activity indicated by the control message (DL-assignment or UL-grant) is performed, and new "active time" and "offset time" parameters are used. Information about the values of the two parameters ("active time" and "offset time") may be provided in any suitable manner. In certain embodiments, the information about the values of the two parameters may be provided per transmission as part of the DL-assignment/UL-grant message sent on the DL control channel, and may vary in-between different DL-assignments/UL-grants.

Aspects of the embodiments described herein are directed to methods performed by a UE in a communication system (e.g., NB-IoT) that controls the connected mode DRX operation and behavior for the UE and a network node (e.g., a radio base station/eNB). In certain embodiments, the method utilizes the properties of the communication capabilities of the NB-IoT devices described above (e.g., half-duplex, one HARQ process, cross-sub-frame scheduling) and typical traffic patterns used to optimize the "active time" for the device (UE) in order to minimize the battery and/or power consumption. Certain embodiments may also advantageously introduce a flexible way of controlling the connected mode DRX operations by dynamically signaling the involved parameters.

According to one example embodiment, a method in a UE is disclosed. The UE monitors a DL control channel during a duration of at least a first timer. The UE receives, on the monitored DL control channel, an indication of a DL or UL transmission for the UE. After receiving the indication of the DL or UL transmission for the UE, the UE stops monitoring the first timer, wherein after the first timer is stopped, the UE does not need to monitor the downlink control channel. The UE performs an UL transmission associated with the indicated DL or UL transmission for the UE. The UE starts a second timer after receiving the indication for the downlink or uplink transmission for the UE, the duration of the second timer comprising an offset period. In certain embodiments, the second timer may be started either: after performing the associated UL transmission; or at the end of the received indication of the DL or UL transmission for the UE. When the second timer expires, the UE starts a third timer, wherein the UE monitors the downlink control channel for the duration of the third channel. In certain embodiments, the UE may enter a discontinuous reception mode when the third timer expires. In certain embodiments, the UE may receive a message including information about a duration of at least one of the second and third timers.

According to another example embodiment, a method in a network node is disclosed. The network node determines a duration of a first timer and a duration of a second timer, the first and second timers for use by a UE to control discontinuous reception operation, wherein the duration of the first timer comprises an offset period. In certain embodiments, the duration of the first timer may comprise one of: an amount of time that the UE waits after sending the uplink transmission associated with the indicated downlink or uplink transmission for the UE before the UE starts the second timer; and an amount of time that the UE waits after the end of the indication of the downlink or uplink transmission for the UE before the UE starts the second timer. In certain embodiments, the duration of the second timer may comprise an amount of time that the UE monitors a DL control channel before entering a discontinuous reception mode. The network node sends, to the UE, information about the duration of the first timer and the duration of the second timer. As one non-limiting example, the network node may send a message to the UE including the information about the duration of the first timer and the duration of the second timer. In some cases, the information about the duration of the first timer and the duration of the second timer may be included in an indication of a DL or UL transmission for the UE.

Figure 5:
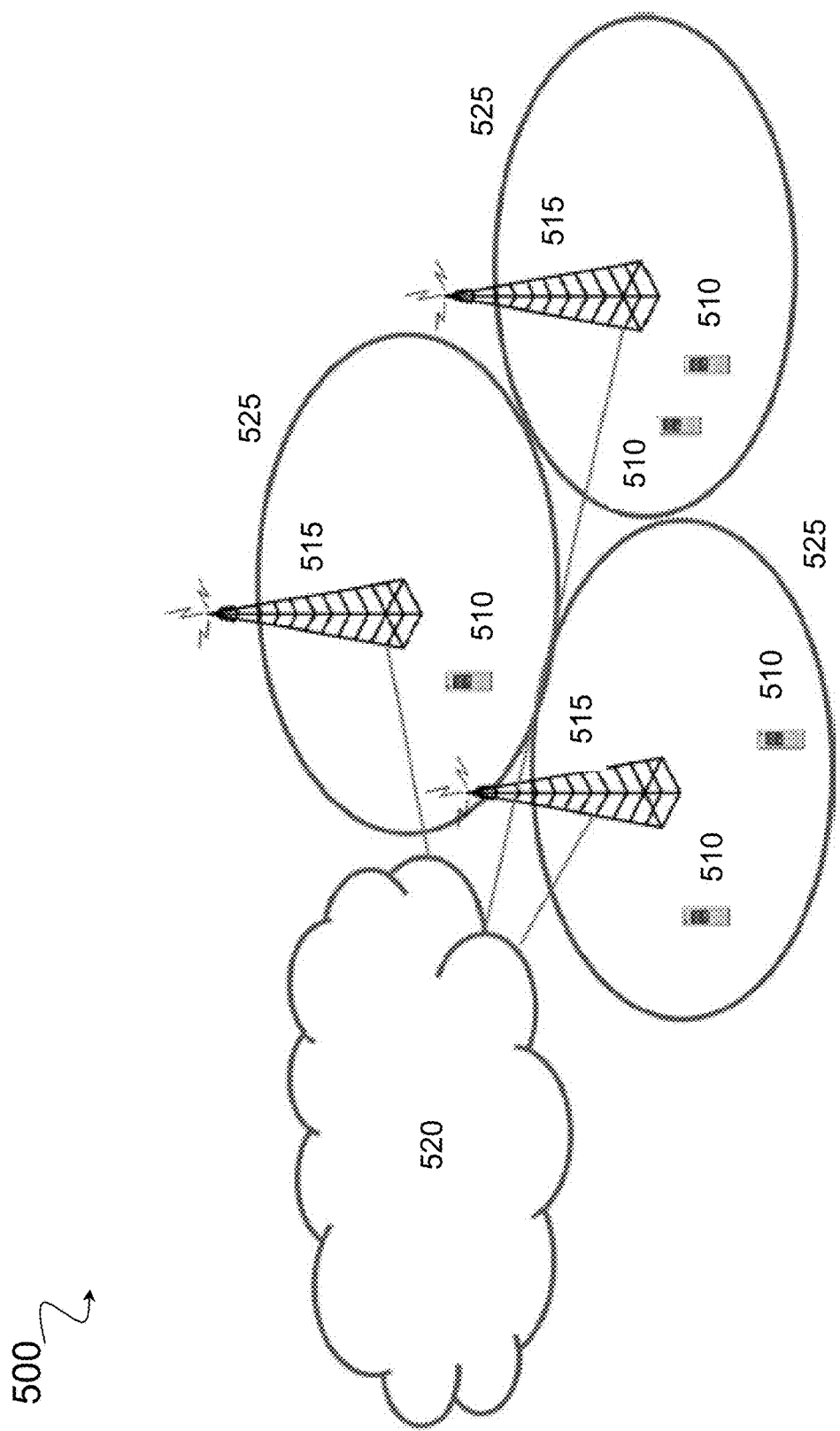
FIG. 5 is a block diagram illustrating an embodiment of a network 500, in accordance with certain embodiments.

FIG. 5 is a block diagram illustrating an embodiment of a network 500, in accordance with certain embodiments. Network 500 includes one or more UE(s) 510 (which may be interchangeably referred to as wireless devices 510) and one or more network node(s) 515 (which may be interchangeably referred to as eNBs 515). UEs 510 may communicate with network nodes 515 over a wireless interface. For example, a UE 510 may transmit wireless signals to one or more of network nodes 515, and/or receive wireless signals from one or more of network nodes 515. The wireless signals may contain voice traffic, data traffic, control signals, and/or any other suitable information. In some embodiments, an area of wireless signal coverage associated with a network node 515 may be referred to as a cell 525. In some embodiments, UEs 510 may have device-to-device (D2D) capability. Thus, UEs 510 may be able to receive signals from and/or transmit signals directly to another UE.

In certain embodiments, network nodes 515 may interface with a radio network controller. The radio network controller may control network nodes 515 and may provide certain radio resource management functions, mobility management functions, and/or other suitable functions. In certain embodiments, the functions of the radio network controller may be included in network node 515. The radio network controller may interface with a core network node. In certain embodiments, the radio network controller may interface with the core network node via an interconnecting network 520. Interconnecting network 520 may refer to any interconnecting system capable of transmitting audio, video, signals, data, messages, or any combination of the preceding. Interconnecting network 520 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 510. UEs 510 may exchange certain signals with the core network node using the non-access stratum layer. In non-access stratum signaling, signals between UEs 510 and the core network node may be transparently passed through the radio access network. In certain embodiments, network nodes 515 may interface with one or more network nodes over an internode interface, such as, for example, an X2 interface.

As described above, example embodiments of network 500 may include one or more UEs 510, and one or more different types of network nodes capable of communicating (directly or indirectly) with UEs 510.

In some embodiments, the non-limiting term UE is used. UEs 510 described herein can be any type of wireless device capable of communicating with network nodes 515 or another UE over radio signals. UE 510 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 510 may operate under either normal coverage or enhanced coverage with respect to its serving cell. The enhanced coverage may be interchangeably referred to as extended coverage. UE 510 may also operate in a plurality of coverage levels (e.g., normal coverage, enhanced coverage level 1, enhanced coverage level 2, enhanced coverage level 3 and so on). In some cases, UE 510 may also operate in out-of-coverage scenarios.

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 510, network nodes 515, and other network nodes (such as radio network controller or core network node) are described in more detail below with respect to FIGS. 13-17.

Although FIG. 5 illustrates a particular arrangement of network 500, the present disclosure contemplates that the various embodiments described herein may be applied to a variety of networks having any suitable configuration. For example, network 500 may include any suitable number of UEs 510 and network nodes 515, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, NB-IoT, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the DL, the present disclosure contemplates that the various embodiments are equally applicable in the UL.

As described above, certain embodiments provide novel methods for controlling DRX operations in connected mode. In the following description of various non-limiting example embodiments, certain assumptions can be made with respect to scheduling and HARQ operations for NB-IoT. First, it is assumed that DL/UL data is scheduled by a message on the DL control channel (e.g., NB-PDCCH). Second, it is assumed that DL/UL data is transmitted on the shared channels (e.g., NB-PDSCH and NB-PUSCH, respectively).

Third, it is assumed that HARQ feedback is transmitted on the channels NB-PDCCH/NB-PUSCH (the UL resource for HARQ feedback is assumed to be sent as part of the DL assignment on NB-PDCCH). Finally, it is assumed that asynchronous HARQ is used in both DL and UL. Note that the scope of the present disclosure is not limited to the various example embodiments described herein. In some cases, none, some, or all of the above assumptions may apply.

As described above, a UE 510 may monitor a DL control channel (e.g., NB-PDCCH). Herein, the time when UE 510 monitors the DL control channel is referred to as the "active time." The behavior of UE 510 in relation to the start of the "active time," stop of the "active time," expiration of the "active time" and how to retrieve information of the length and start of "active time" is described generally below in the context of FIG. 5, and in detail with respect to FIGS. 6A-9B below. In certain embodiments, the start of the "active time" occurs an "offset time" after an UL transmission from UE 510.

In certain embodiments, the behavior of UE 510 is described in the context of NB-IoT, and when the "active time" expires UE 510 is said to enter DRX operation in a similar way as in legacy LTE (i.e., the NB-PDCCH is only monitored during an "On Duration time" every DRX cycle). Note, however, that the various embodiments described herein are not limited to the NB-IoT context. Rather, the present disclosure contemplates that the various embodiments described herein are applicable to any suitable RATs.

In general, two main parameters are used: an "active time" that determines for how long a time the UE should be awake to monitor the DL control channel before going into DRX; and an "offset time" that determines when to start the "active time." As described above, the "offset time" (which may be referred to herein interchangeably as "offset period") is started relative to an UL transmission performed by UE 510 that was triggered by receiving an indication of a DL or UL transmission for UE 510 (e.g., a control message on the DL control channel (e.g., NB-PDCCH), such as: a DL assignment for receiving DL data resulting in that the UL transmission is a HARQ feedback message; or an UL grant resulting in that said UL transmission is UL data).

If a new control message is received on the DL control channel during the "active time," the "active time" is stopped (i.e., the UE does not need to be awake to monitor the DL control channel (e.g., NB-PDCCH). Instead, the activity as said control message (e.g., DL-assignment or UL-grant) indicated is first performed and a new "active time" and "offset time" are used.

In certain embodiments, information about the values of the two parameters ("active time" and "offset time") is provided per transmission as part of the DL-assignment/UL-grant message sent on the DL control channel, and may vary in-between every DL-assignment/UL-grant. For example, in certain embodiments a network node (e.g., network node 515) may determine a duration of the "active time" and the "offset time" for use by UE 510 to control DRX operation. Network node 515 may send information about the durations of the "active time" and the "offset time" to UE 510. Network node 515 may send the information to UE 510 in any suitable manner. As one example, network node 515 may send a message to UE 510 including information about the duration of the "active time" and the "offset time." As another example, the information about the duration of the "active time" and the "offset time" may be included in the indication of a DL or UL transmission for UE 510 (e.g., a control message on the DL control channel (e.g, NB-PD- CCH), such as: a DL assignment for receiving DL data resulting in that the UL transmission is a HARQ feedback message; or an UL grant resulting in that said UL transmission is UL data).

Although certain example embodiments may be described in terms of parameters described as time durations, this is for purposes of example only. The various embodiments described herein are not limited to such examples. Rather, the present disclosure contemplates that timers may be used instead when implementing, specifying, describing, and/or modeling these features of the various embodiments. Persons skilled in the art understand that descriptions using a time duration or a timer may be equivalent. In some cases, when implementing the various embodiments described herein in a device, a timer could preferably be used. In such a scenario, UE 510 may start a timer (with duration "offset time") after the UL transmission ends, and upon expiry of said timer a new timer (with duration "offset time") may be started, and while running UE 510 monitors the DL control channel (e.g., NB-PDCCH). Although the use of multiple timers is discussed herein, according to alternative embodiments, fewer timers (or even no timers) may be used, as long as time duration is still monitored and determined.

For example, in certain embodiments UE 510 monitors a DL control channel (e.g., NB-PDCCH) during a duration of at least a first timer. In certain embodiments, one or more timers may be running at this time. In certain embodiments, the first timer of the one or more timers may be one of an onDurationTimer of a DRX cycle, a drx-InactivityTimer, and a DRX retransmission timer. UE 510 may receive, on the monitored DL control, an indication of a DL or UL transmission for UE 510 (e.g., a DL scheduling assignment or an UL grant, respectively). After receiving the indication of the DL or UL transmission for UE 510, UE 510 may stop monitoring the first timer, and perform an UL transmission associated with the indicated DL or UL transmission for UE 510 (e.g., send an ACK message or a data transmission in the UL). According to certain embodiments, after receiving the indication of the DL or UL transmission for UE 510, UE 510 may also stop monitoring of the DL control channel. According to alternative embodiments, the UE is no longer required to monitor the DL control channel at this point, but may continue to do so. After receiving the indication of the DL or UL transmission, UE 510 starts a second timer, the duration of the second timer comprising an offset period (e.g., a HARQ-RTT timer that comprises an offset period). According to certain embodiments, UE may start the second timer after performing the associated UL transmission. When the second timer expires, UE 510 may start a third timer (e.g., a drx-InactivityTimer or a discontinuous reception retransmission timer). In certain embodiments, UE 510 may monitor the DL control channel during the duration of the third timer, and enter DRX mode when the third timer expires.

The various embodiments will now be described in more detail below with respect to FIGS. 6-9. Note that the time durations of the transmissions and the offsets in-between transmissions shown in FIGS. 6-9 are not to scale and are not necessarily in a time unit such as one frame/sub-frame (e.g., 1 ms). Rather, FIGS. 6-9 are used to illustrate what is transmitted (e.g., control/data) on the different NB-IoT physical channels, in what order, the different channel/transmission offsets, and what timer durations exist. Note that the description below includes examples of the use of both time durations and timers. To reflect that either implementation is possible, FIGS. 6-9 illustrate a "*time(r)," an "offset time(r)," and an "active time(r)."

Figure 6A:
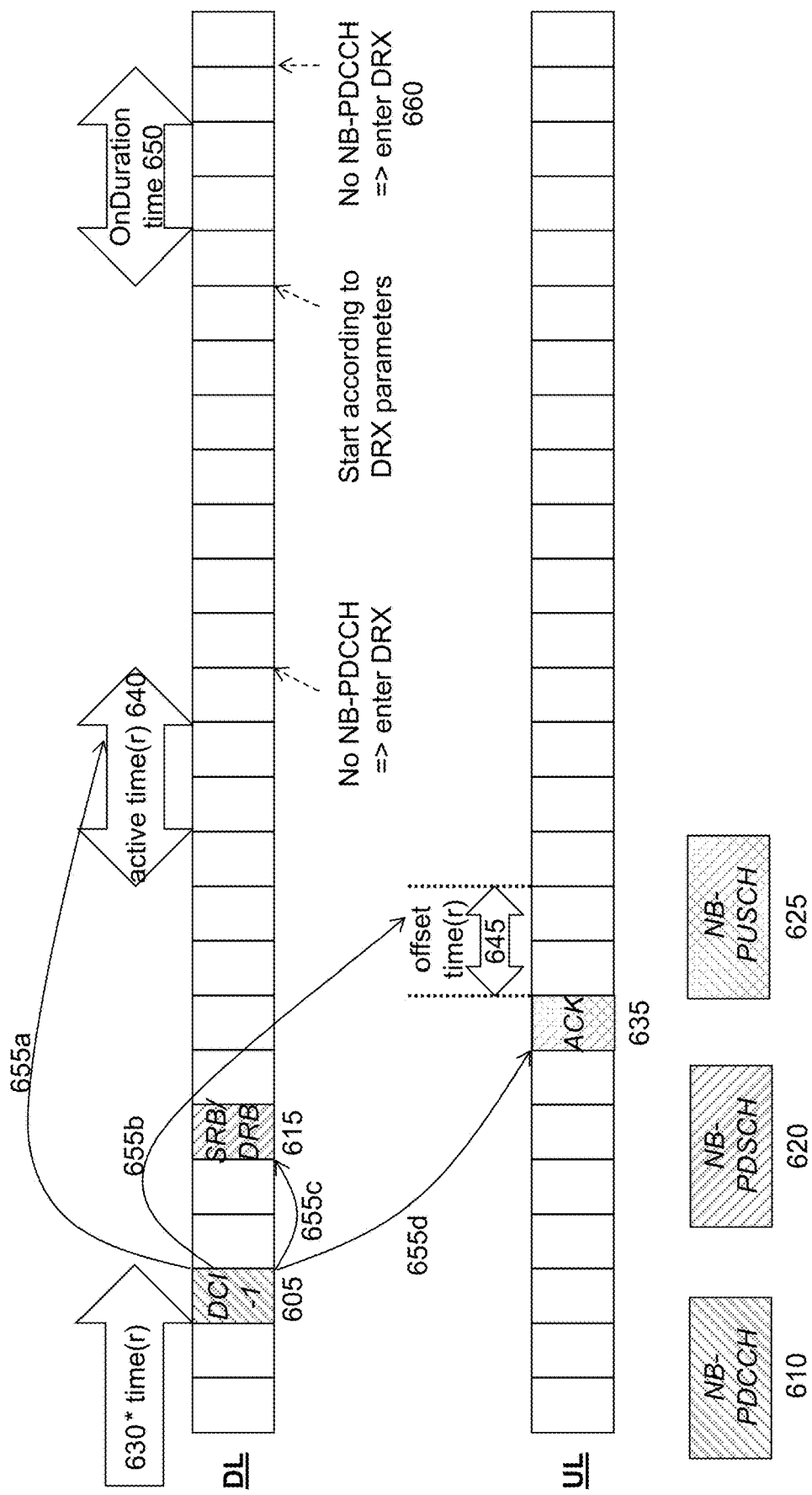
FIG. 6A illustrates a first example of timing and transmission for controlling DRX operations, in accordance with certain embodiments.

FIG. 6A illustrates a first example of timing and transmission for controlling DRX operations, in accordance with certain embodiments. More particularly, FIG. 6A shows an indication of a DL transmission 605 for a UE received on downlink control channel 610 (NB-PDCCH in the example of FIG. 6A), namely a DL scheduling assignment (denoted DCI-1 in the example of FIG. 6A) with resulting data transmission 615. In other words, message 605 (denoted DCI-1) is received by the UE on DL control channel 610 that schedules a DL data block 615 (denoted SRB/DRB in the example of FIG. 6A) to be received by the UE on NB-PDSCH 620 (either on a Signaling Radio Bearer (SRB) or a Data Radio Bearer (DRB)). As described above, the HARQ feedback resource for NB-PUSCH 635 is assumed to be included in the NB-PDCCH message 605 (i.e., DCI-1).

In the example of FIG. 6A, after receiving the indication of the DL transmission 605 for the UE (i.e., when the DCI-1 is received), "*time" 630 is stopped and the UE stops monitoring DL control channel 610. This is because DL control channel 610 does not need to be monitored any longer due to successful reception in the UE. According to alternative embodiments, control channel 610 may still be monitored, even though the UE is no longer required to do so. The "*" indicates that it could be either an "On Duration" or "active" time. For example, in embodiments in which one or more timers are used, "*time" 630 shown in the example of FIG. 6A may be a first timer during the duration of which the UE monitors DL control channel 610. For example, first timer 630 may be one of an onDurationTimer of a DRX cycle, a drx-InactivityTimer, and a DRX retransmission timer. Message 605 triggers an UL transmission activity 635 later in time. In the DL assignment case shown in the example of FIG. 6A, first SRB/DRB data 615 on NB-PDSCH 620 is received and, based on the decoding result, the HARQ feedback is sent (ACK 635 in the example of FIG. 6A) on NB-PUSCH 625. In other words, DCI-1 message 605 is an indication of a DL transmission for the UE, and the UE performs UL transmission 635 associated with the indicated DL transmission (namely, the sending of an acknowledgement message).

After performing associated UL transmission 635, "active time" 640 is started an "offset time" 645 after UL transmission 635 ends. In embodiments in which timers are used, for example, after performing associated UL transmission 635 (the ACK message in the example of FIG. 6A), the UE starts second timer 645. The duration of second timer 645 may be or comprise an offset period. For example, second timer 645 may be a HARQ-RTT timer that comprises an offset period. When second timer 645 expires, the UE starts third timer 640 corresponding to the "active time" described above. In certain embodiments, third timer 640 may be one of a drx-InactivityTimer and a DRX retransmission timer. During the "active time" (e.g., during the duration of third timer 640), the UE monitors DL control channel 610 (NB-PDCCH in the example of FIG. 6A). If no NB-PDCCH message is received before "active time" 640 ends (e.g., before third timer 640 expires), the UE enters DRX mode 660 as shown in the example of FIG. 6A. During DRX, the previously-described concepts apply (i.e., the UE wakes up for a period of time 650 ("On Duration") to monitor DL control channel 610 (e.g., NB-PDCCH).

In the example of FIG. 6A, the arrows 655a-d going from DCI-1 message 605 are intended to illustrate that the size (e.g., duration) of "offset time" 645 and "active time" 640 (or the duration of second timer 645 and third timer 640 described above, respectively) is included in DCI-1 message 605 (or relevant information to be able to determine the timer duration). In certain embodiments, these parameters may change between each scheduled transmission (e.g., DL assignment or UL grant), allowing the parameters to be dynamically changed for every transmission. For example, a network node (e.g., eNB 515 described above in relation to FIG. 5) may determine a duration of second timer 645 comprising an offset period and third timer 640 described above for use by the UE to control DRX operation. The duration of second timer 645 may be an amount of time that the UE waits after sending UL transmission 635 associated with the indicated DL transmission for the UE before the UE starts third timer 640. The duration of third timer 640 may comprise an amount of time that the UE monitors DL control channel 610 before entering DRX mode. The network node may send, to the UE, information about the duration of second timer 645 and third timer 640 to the UE.

The present disclosure contemplates that information about the various parameters (e.g., length of "offset time" 645 and "active time" 640 or duration of second timer 645 and third timer 640 described above) may be signaled in any suitable manner. For example, they could be part of an L3 message or broadcasted on the system information. In such a scenario, the parameters would be semi-static as in previous approaches and not as flexible as sending them as part of the NB-PDCCH message 605 (e.g., DCI-1 in the example of FIG. 6A). Note also that the exact value does not necessarily need to be signaled. Instead, a table could be broadcasted and/or pre-defined and an index to that table could be signaled and/or included.

In the example of FIG. 6A involving a DL assignment, typical examples of the different time durations are given below. Note, however, that any values may apply depending on, for example, the used UL/DL frequency resources, coding rate & number of repetitions (i.e., the redundancy), message/data size, modulation type, network node (e.g., eNB) scheduling strategy, and any other suitable criteria. In certain embodiments, the NB-PDCCH (DCI-1) duration may be 2 ms. The offset between NB-PDCCH and NB-PDSCH may be 4 ms. The NB-PDSCH (SRB/DRB) duration may be 20 ms. The offset between NB-PDSCH and NB-PUSCH may be 2 ms. The NB-PUSCH (ACK) duration may be 4 ms. The duration of "offset time" 645 may be 10 ms. The duration of "active time" 640 may be 20 MS.

Figure 6B:
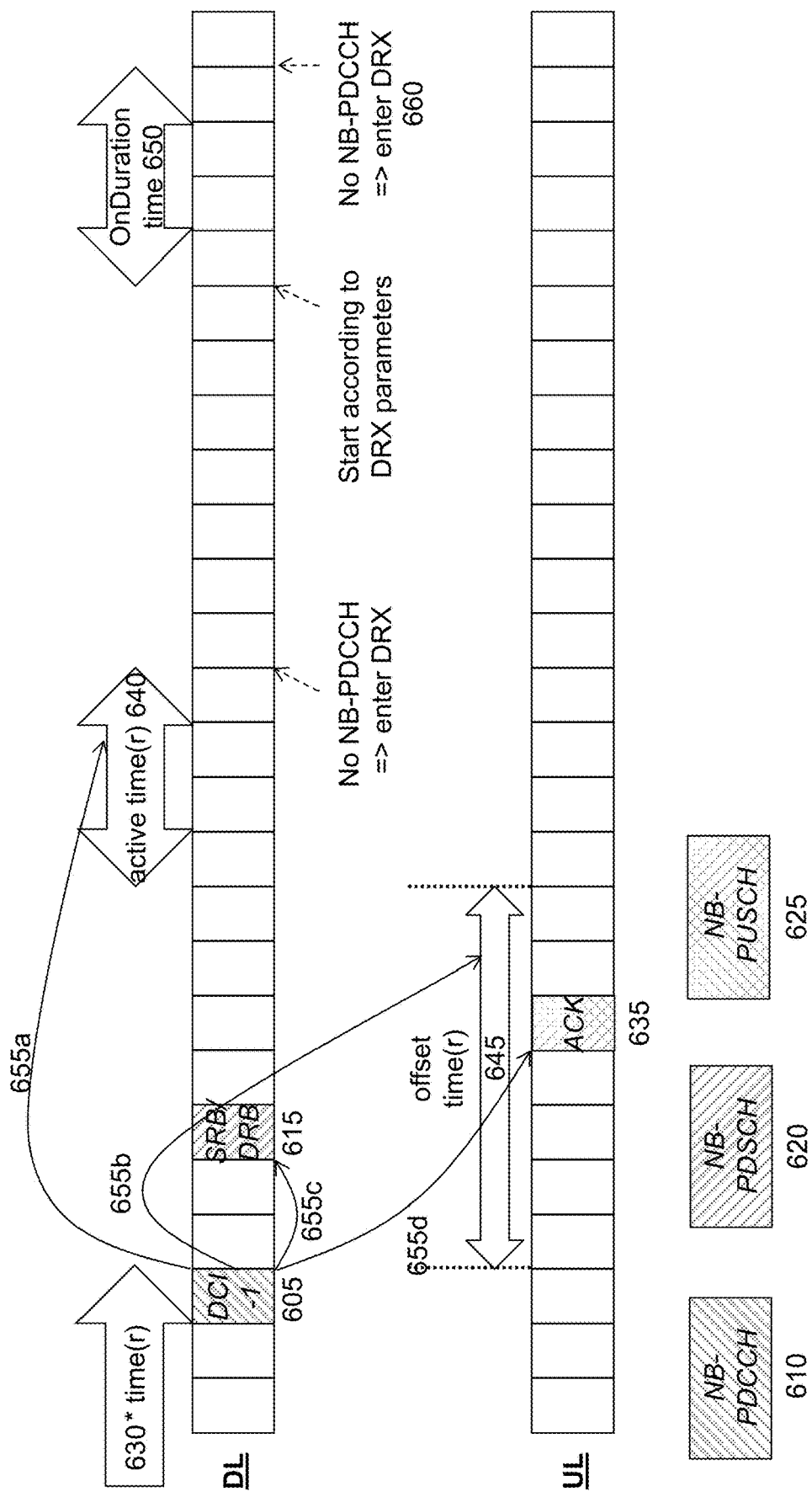
FIG. 6B illustrates a variation of the first example of timing and transmission for controlling DRX operations in FIG. 6A, in accordance with certain embodiments.

FIG. 6B illustrates a variation of the first example of timing and transmission for controlling DRX operations in FIG. 6A, in accordance with certain embodiments. FIG. 6B is similar to FIG. 6A, so only the differences will be described. In the example embodiment of FIG. 6B, "active time" 640 is started an "offset time" 645 after the end of the received indication of a DL transmission 605 for the UE received on DL control channel 610 (NB-PDCCH in the example of FIG. 6B), namely a DL scheduling assignment (denoted DCI-1 in the example of FIG. 6B). In embodiments in which timers are used, for example, after the end of the received indication of DL transmission 605 for the UE, the UE starts second timer 645. The duration of second timer 645 may be or comprise an offset period. For example, second timer 645 may be a HARQ-RTT timer that comprises an offset period. When second timer 645 expires, the UE starts third timer 640 corresponding to the "active time."

Figure 7A:
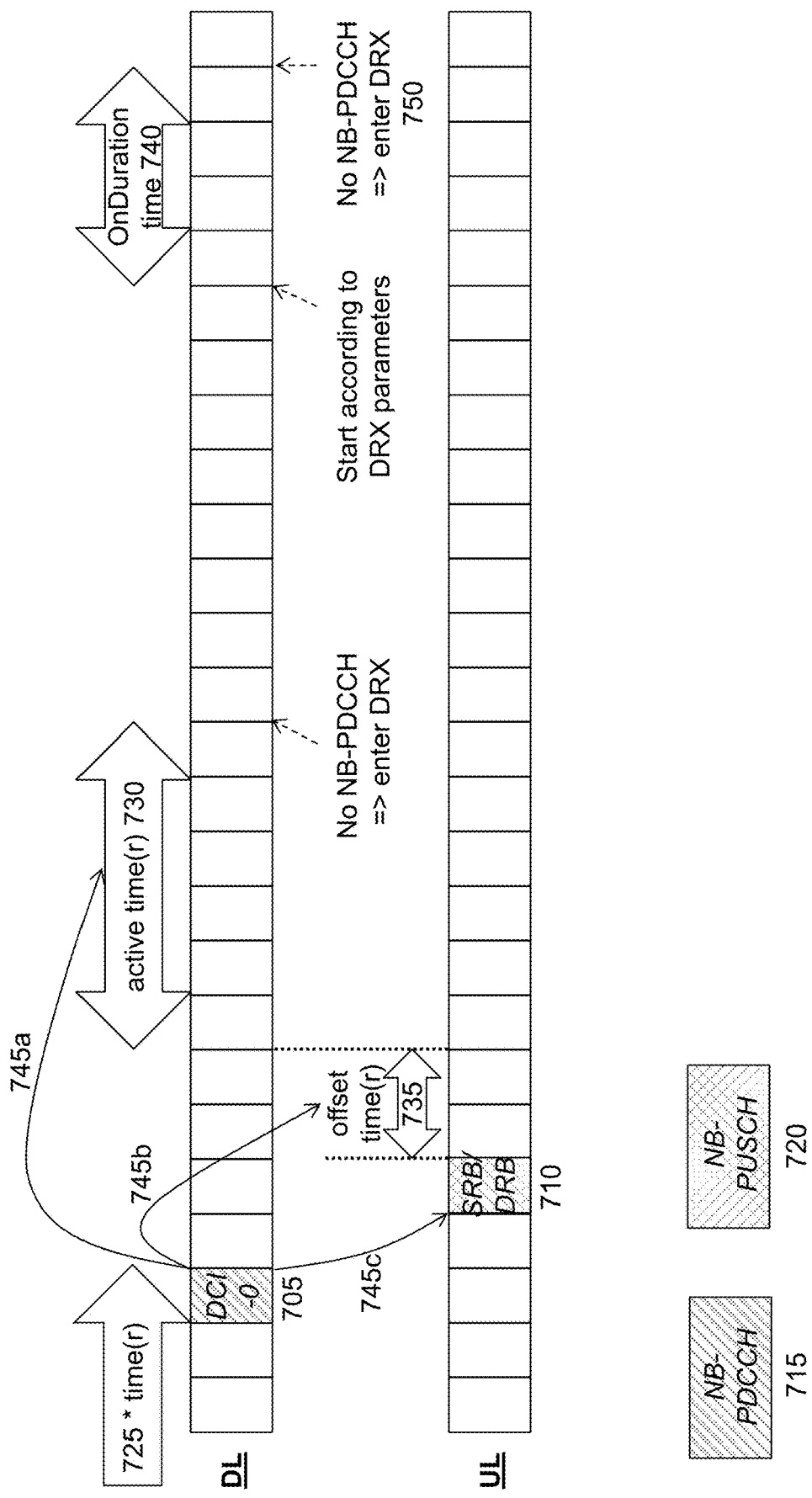
FIG. 7A illustrates a second example of timing and transmission for controlling DRX operations, in accordance with certain embodiments.

FIG. 7A illustrates a second example of timing and transmission for controlling DRX operations, in accordance with certain embodiments. More particularly, FIG. 7A shows an indication of an UL transmission for the UE, namely UL grant 705 (denoted DCI-0 in the example of FIG. 7A) with resulting UL transmission 710. In other words, message 705 (denoted DCI-0) is received by the UE on DL control channel 715 (NB-PDCCH in the example of FIG. 7A) that schedules UL data block 710 to be sent by the UE on NB-PUSCH 720 (either on an SRB or a DRB).

In the example of FIG. 7A, after receiving the indication of the UL transmission for the UE (i.e., when DCI-0 705 is received) "*time" 725 is stopped and the UE stops monitoring DL control channel 715. This is because DL control channel 715 (NB-PDCCH in the example of FIG. 7) does not need to be monitored any longer due to successful reception in the UE. According to alternative embodiments, control channel 715 may still be monitored, even though the UE is no longer required to do so. Similar to FIG. 6A described above, "*time" 725 indicates that it could be either an "On Duration" or "active" time. For example, in embodiments in which one or more timers are used, "*time" 725 may be a first timer 725 during the duration of which the UE monitors DL control channel 715. For example, first timer 725 may be one of an onDurationTimer of a DRX cycle, a drx-InactivityTimer, and a DRX retransmission timer. Message 705 triggers an UL transmission activity 710 later in time. In the UL grant case shown in the example of FIG. 7A, the UE performs transmission of SRB/DRB data 710 on NB-PUSCH 720. In other words, DCI-0 message 705 is an indication of an UL transmission 710 for the UE, and the UE performs the UL transmission associated with the indication (namely, transmission of SRB/DRB data 710 on NB-PUSCH 720).

After performing associated UL transmission 710, "active time" 730 is started an "offset time" 735 after UL transmission 710 ends. In embodiments in which timers are used, for example, after performing associated UL transmission 710, the UE starts second timer 735 corresponding to the "offset time" described above. The duration of second timer 735 may be or comprise an offset period. For example, second timer 735 may be a HARQ-RTT timer that comprises an offset period. When second timer 735 expires, the UE starts third timer 730 corresponding to the "active time" described above. In certain embodiments, third timer 730 may be one of a drx-InactivityTimer and a DRX retransmission timer. During "active time" 730 (e.g., during the duration of third timer 730), the UE monitors DL control channel 715 (NB-PDCCH in the example of FIG. 7A). If no NB-PDCCH message is received before "active time" 730 ends (i.e., before third timer 730 expires), the UE enters DRX mode 750 as shown in the example of FIG. 7A. During DRX, the previously-applied concepts apply (i.e., the UE wakes up for a period of time 740 ("On Duration") to monitor DL control channel 715 (e.g., NB-PDCCH).

In the example of FIG. 7A, arrows 745a-c going from DCI-0 message 705 are intended to illustrate that the size (e.g., duration) of "offset time" 735 and "active time" 730 (or the duration of second timer 735 and third timer 730 described above, respectively) is included in DCI-0 message 705 (or relevant information to be able to determine the timer duration). In certain embodiments, these parameters may change between each scheduled transmission (e.g., DL assignment or UL grant), allowing the parameters to be dynamically changed for every transmission. For example, a network node (e.g., eNB 515 described above in relation to FIG. 5) may determine a duration of second timer 735 and third timer 730 described above for use by the UE to control DRX operation. The duration of second timer 735 may be an amount of time that the UE waits after sending UL transmission 710 associated with the indicated DL or UL transmission for the UE before the UE starts third timer 730. The duration of third timer 730 may comprise an amount of time that the UE monitors DL control channel 715 before entering DRX mode. The network node may send, to the UE, information about the duration of second timer 735 and third timer 730 to the UE.

The present disclosure contemplates that information about the various parameters (e.g., length of "offset time" 735 and "active time" 730 or duration of second timer 735 and third timer 730 described above) may be signaled in any suitable manner. For example, they could be part of an L3 message or broadcasted on the system information. In such a scenario, the parameters would be semi-static and not as flexible as sending them as part of the NB-PDCCH message (e.g., DCI-0 705 in the example of FIG. 7A). Note also that the exact value does not necessarily need to be signaled. Instead, a table could be broadcasted and/or pre-defined and an index to that table could be signaled and/or included.

The present disclosure contemplates that the values of the various parameters may be any suitable values. In certain embodiments, the values may vary based on any suitable criteria. For example, the values of the various parameters may depend on the used UL/DL frequency resources, coding rate and number of repetitions (i.e., the redundancy), message/data size, modulation type, network node (e.g., eNB) scheduling strategy, and any other suitable criteria.

Figure 7B:
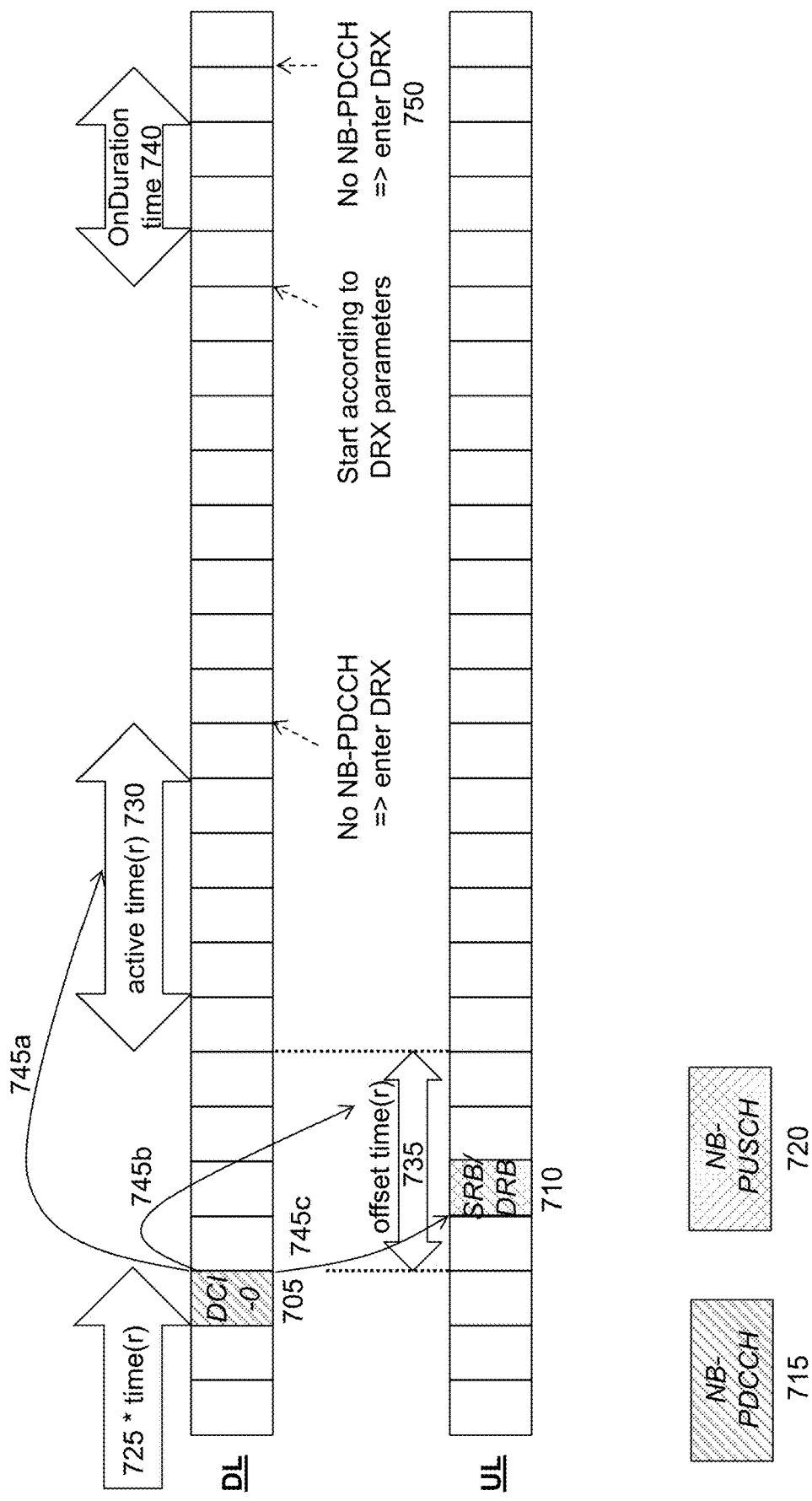
FIG. 7B illustrates a variation of the second example of timing and transmission for controlling DRX operations in FIG. 7A, in accordance with certain embodiments.

FIG. 7B illustrates a variation of the second example of timing and transmission for controlling DRX operations in FIG. 7A, in accordance with certain embodiments. FIG. 7B is similar to FIG. 7A, so only the differences will be described. In the example embodiment of FIG. 7B, "active time" 730 is started an "offset time" 735 after the end of the received indication of an UL transmission 705 for the UE received on DL control channel 715 (NB-PDCCH in the example of FIG. 7B), namely an UL grant (denoted DCI-0 in the example of FIG. 7B). In embodiments in which timers are used, for example, after the end of the received indication of UL transmission 705 for the UE, the UE starts second timer 735. The duration of second timer 735 may be or comprise an offset period. For example, second timer 735 may be a HARQ-RTT timer that comprises an offset period. When second timer 735 expires, the UE starts third timer 730 corresponding to the "active time."

Figure 8A:
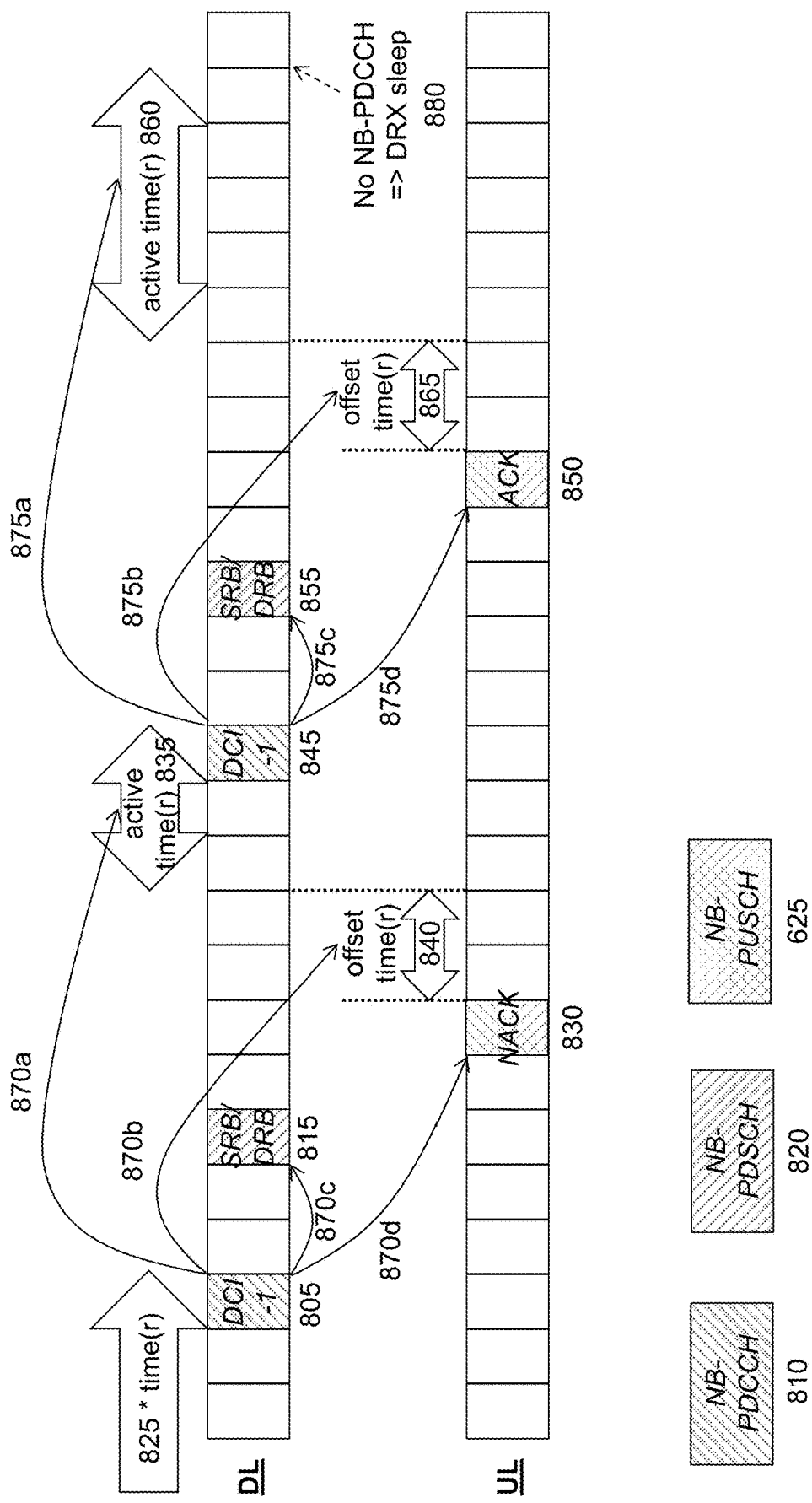
FIG. 8A illustrates a third example of timing and transmission for controlling DRX operations, in accordance with certain embodiments.

FIG. 8A illustrates a third example of timing and transmission for controlling DRX operations, in accordance with certain embodiments. More particularly, FIG. 8A illustrates a scenario in which a HARQ retransmission is triggered for the DL. Similar to the example of timing and transmission for controlling DRX operations illustrated in FIG. 6A, FIG. 8A shows an indication of a DL transmission 805 for the UE, namely DL scheduling assignment (denoted DCI-1 in the example of FIG. 8A) on downlink control channel 810 with resulting data transmission 815. In other words, message 805 (denoted DCI-1) received by the UE on DL control channel 810 (NB-PDCCH in the example of FIG. 8A) schedules a DL data block 815 (denoted SRB/DRB in the example of FIG. 8A) to be received by the UE on NB-PDSCH 820 (either on a SRB or a DRB).

In the example of FIG. 8A, upon receiving the indication of the DL transmission 805 for the UE (i.e., when the DCI-1 805 is received), "*time" 825 is stopped and the UE stops monitoring DL control channel 810. This is because DL control channel 810 does not need to be monitored any longer due to successful reception in the UE. According to alternative embodiments, control channel 810 may still be monitored, even though the UE is no longer required to do so. The "*time" 825 indicates that it could be either an "On Duration" or "active" time. For example, in embodiments in which one or more timers are used, "*time" 825 shown in the example of FIG. 8A may be a first timer 825 during the duration of which the UE monitors DL control channel 810. For example, first timer 825 may be one of an onDuration-Timer of a DRX cycle, a drx-InactivityTimer, and a DRX retransmission timer. Message 805 triggers an UL transmission activity 830 later in time.

In the DL assignment case shown in the example of FIG. 8A, first the SRB/DRB data 815 on NB-PDSCH 820 is received and, based on the decoding result, HARQ feedback 830 is sent (a NACK in the example of FIG. 8A). In other words, DCI-1 message 805 is an indication of a DL transmission for the UE, and the UE performs an UL transmission 830 associated with the indicated DL transmission. In the example of FIG. 8A, the associated UL transmission 830 is HARQ feedback in the form of a "NACK" that triggers a HARQ re-transmission.

After performing associated UL transmission 830, "active time" 835 is started an "offset time" 840 after UL transmission 830 ends. In embodiments in which timers are used, for example, after performing associated UL transmission 830 (the NACK message in the example of FIG. 8A), the UE starts second timer 840. The duration of second timer 840 may be or comprise an offset period. For example, second timer 840 may be a HARQ-RTT timer that comprises an offset period. When second timer 840 expires, the UE starts third timer 835 corresponding to the "active time" described above. In certain embodiments, third timer 835 may be one of a drx-InactivityTimer and a DRX retransmission timer. During "active time" 835 (e.g., during the duration of third timer 835), the UE monitors DL control channel 810 (NB-PDCCH in the example of FIG. 8A). If no NB-PDCCH message is received before "active time" 835 ends (i.e., before third timer 835 expires), the UE enters DRX mode. During DRX, the previously-applied concepts apply (i.e., the UE wakes up for a period of time ("On Duration") to monitor DL control channel 810 (e.g., NB-PDCCH).

In the example of FIG. 8A, however, the UE receives an indication of a second DL transmission 845 for the UE (i.e., when the second DCI-1 845 is received), "active time" 835 is stopped and the UE stops monitoring DL control channel 810. This is because DL control channel 810 (NB-PDCCH in the example of FIG. 8A) does not need to be monitored any longer due to successful reception in the UE of second DCI-1 message 845. Second message 845 triggers an UL transmission activity 850 later in time. In the DL assignment case shown in the example of FIG. 8A, first the second instance of SRB/DRB data 855 on NB-PDSCH 820 is received and, based on the decoding result, the HARQ feedback is sent (ACK 850 in the example of FIG. 8A). In other words, second DCI-1 message 845 is a second indication of a DL transmission 855 for the UE (i.e., a HARQ re-transmission of the DL transmission 835), and the UE performs the UL transmission 850 associated with the indicated DL HARQ re-transmission (namely, the sending of ACK message 850).

After performing the associated UL transmission 850, "active time" 860 is started "offset time" 865 after UL transmission 850 ends. In embodiments in which timers are used, for example, after performing the associated UL transmission 850 (the NACK message in the example of FIG. 8A), the UE starts second timer 865. The duration of second timer 865 may be or comprise an offset period. For example, second timer 865 may be a HARQ-RTT timer that comprises an offset period. When second timer 865 expires, the UE starts third timer 860 corresponding to the "active time" described above. In certain embodiments, third timer 860 may be one of a drx-InactivityTimer and a DRX retransmission timer. During "active time" 860 (e.g., during the duration of third timer 860), the UE monitors DL control channel 810 (NB-PDCCH in the example of FIG. 8A). If no NB-PDCCH message is received before "active time" 860 ends (i.e., before third timer 860 expires), the UE enters DRX mode 880 as shown in the example of FIG. 8A. During DRX, the previously-applied concepts apply (i.e., the UE wakes up for a period of time ("On Duration") to monitor DL control channel 810 (e.g., NB-PDCCH).

In the example of FIG. 8A, the arrows 870*a-d* going from first DCI-1 message 805 and arrows 875*a-d* going from second DCI-1 message 845 are intended to illustrate that the size (e.g., duration) of "offset time" 840, "active time" 835, "offset time" 865 and "active time" 860 (or, in certain embodiments, the duration of second and third timers described above, respectively) may be included in first DCI-1 message 805 and second DCI-1 message 845, respectively (or relevant information to be able to determine the timer duration). In certain embodiments, these parameters may change between each scheduled transmission (e.g., between the first DCI-1 message and the second DCI-1 message), allowing the parameters to be dynamically changed for every transmission. Thus, the duration of "offset time" 840 may be the same or different than "offset time" 865. Similarly, the duration of "active time" 835 may be the same or different than "active time" 860. A network node (e.g., eNB 515 described above in relation to FIG. 5) may determine a duration of the second timers 840, 865 and the third timers 835, 860 described above for use by the UE to control DRX operation. The durations of the second timers 840, 865 may be an amount of time that the UE waits after sending the UL transmissions 830, 850 associated with the indicated DL or UL transmissions for the UE, respectively, before the UE starts third timers 835, 860. The duration of third timers 835, 860 may comprise an amount of time that the UE monitors a DL control channel before entering DRX mode. The network node may send, to the UE, information about the duration of second timers 840, 865 and third timers 835, 860 to the UE. In some cases, the durations may be different for the first DL transmission associated with first DCI-1 message 805 and second DCI-1 message 845. In certain embodiments, the durations may be the same. The various parameters (e.g., length of "offset time" 840, 865 and "active time" 835, 860 or the duration of second timers 840, 865 and third timers 835, 860 described above) may be signaled in any suitable manner. The various examples of signaling described above with respect to FIG. 6 are equally applicable to the example embodiment of FIG. 8A.

Figure 8B:
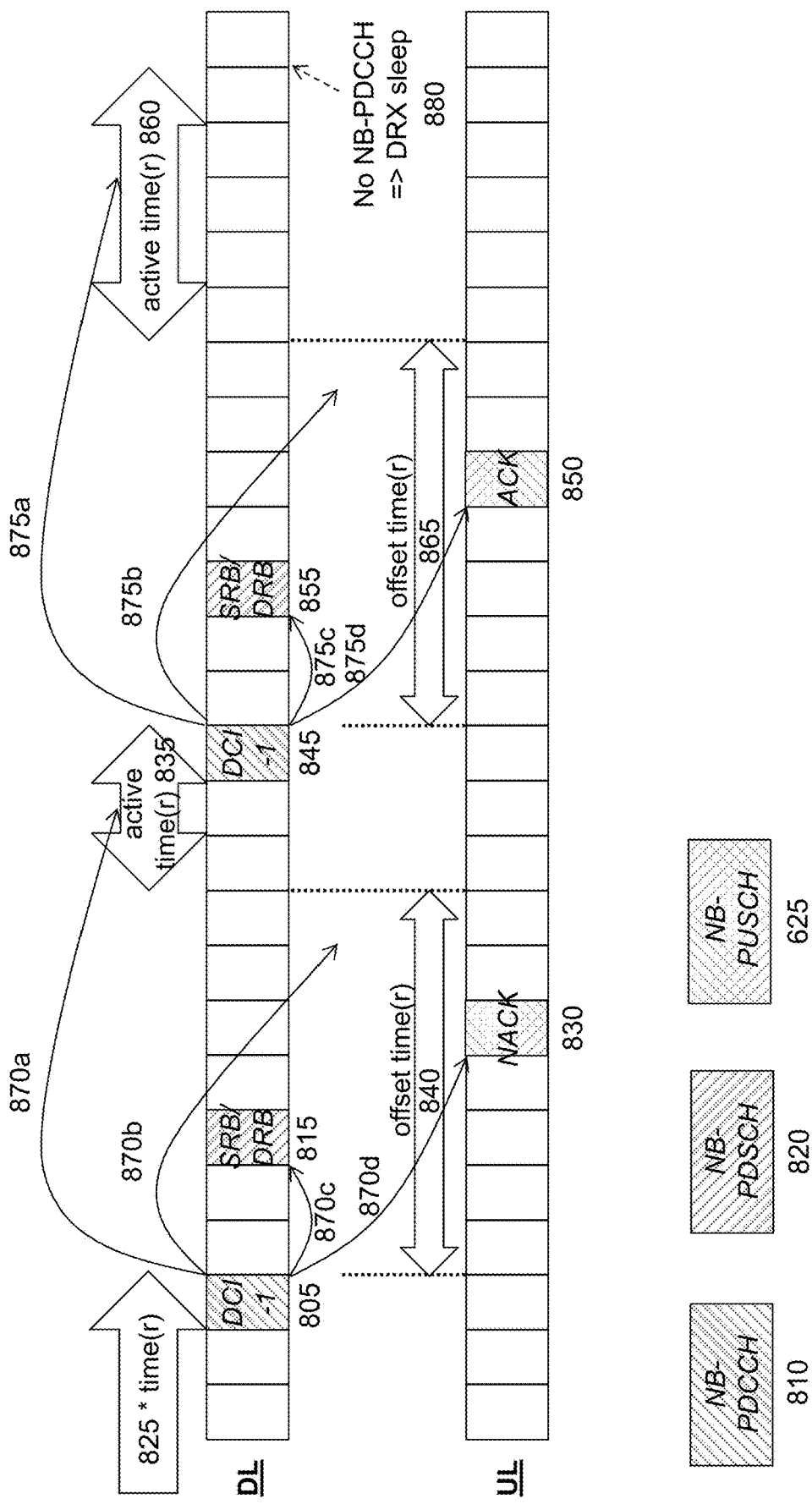
FIG. 8B illustrates a variation of the third example of timing and transmission for controlling DRX operations in FIG. 8A, in accordance with certain embodiments.

FIG. 8B illustrates a variation of the third example of timing and transmission for controlling DRX operations in FIG. 8A, in accordance with certain embodiments. FIG. 8B is similar to FIG. 8A, so only the differences will be described. In the example embodiment of FIG. 8B, "active time" 835 is started an "offset time" 840 after the end of the received indication of a DL transmission 805 for the UE received on DL control channel 810 (NB-PDCCH in the example of FIG. 8B), namely a DL scheduling assignment (denoted DCI-1 in the example of FIG. 8B). In embodiments in which timers are used, for example, after the end of the received indication of DL transmission 805 for the UE, the UE starts second timer 840. The duration of second timer 840 may be or comprise an offset period. For example, second timer 840 may be a HARQ-RTT timer that comprises an offset period. When second timer 840 expires, the UE starts third timer 835 corresponding to the "active time."

Similar to FIG. 8A described above, in the example of FIG. 8B the UE receives an indication of a second DL transmission 845 for the UE (i.e., when the second DCI-1 845 is received). In such a scenario, "active time" 835 is stopped and the UE stops monitoring DL control channel 810. In the example of FIG. 8B, however, "active time" 860 is started an "offset time" 865 at the end of the second received indication of a DL transmission 845 for the UE received on DL control channel 810 (NB-PDCCH in the example of FIG. 8B), namely a DL scheduling assignment (denoted DCI-1 in the example of FIG. 8B). In embodiments in which timers are used, for example, after the end of the second received indication of DL transmission 845 for the UE, the UE starts second timer 865. The duration of second timer 865 may be or comprise an offset period. For example, second timer 865 may be a HARQ-RTT timer that comprises an offset period. When second timer 865 expires, the UE starts third timer 860 corresponding to the "active time."

Figure 9A:
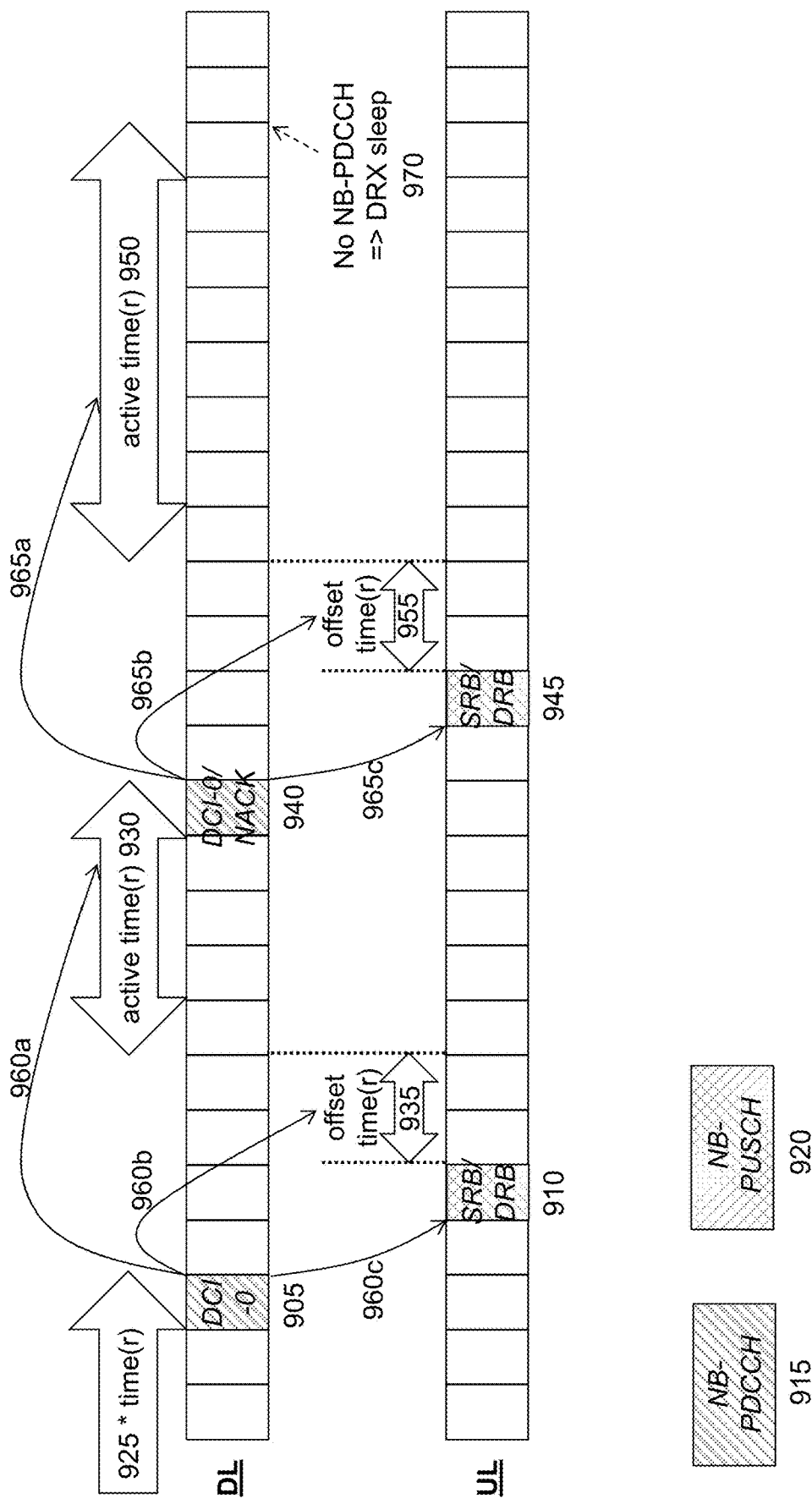
FIG. 9A illustrates a fourth example of timing and transmission for controlling DRX operations, in accordance with certain embodiments.

FIG. 9A illustrates a fourth example of timing and transmission for controlling DRX operations, in accordance with certain embodiments. More particularly, FIG. 9 illustrates a scenario in which a HARQ retransmission is triggered for the UL. Similar to FIG. 7A described above, the example of FIG. 9A illustrates a first indication of an UL transmission 905 for the UE, namely an UL grant (denoted DCI-0 in the example of FIG. 9A) with resulting UL transmission 910. In other words, first message 905 (denoted DCI-0) is received by the UE on DL control channel 915 (NB-PDCCH in the example of FIG. 9A) that schedules an UL data block 910 to be sent by the UE on NB-PUSCH 920 (either on an SRB or a DRB).

In the example of FIG. 9A, upon receiving the indication of the UL transmission 905 for the UE (i.e., when DCI-0 is received) "*time" 925 is stopped and the UE stops monitoring DL control channel 915. This is because DL control channel 915 (NB-PDCCH in the example of FIG. 9A) does not need to be monitored any longer due to successful reception in the UE. According to alternative embodiments, control channel 915 may still be monitored, even though the UE is no longer required to do so. Similar to FIG. 7A described above, "*time" 925 indicates that it could be either an "On Duration" or "active" time. For example, in embodiments in which one or more timers are used, "*time" 925 shown in the example of FIG. 9A may be first timer 925 during the duration of which the UE monitors DL control channel 915. For example, first timer 925 may be one of an onDurationTimer of a DRX cycle, a drx-InactivityTimer, and a DRX retransmission timer. Message 905 triggers an UL transmission activity 910 later in time. In the UL grant case shown in the example of FIG. 9A, the UE performs transmission of SRB/DRB data 910 on NB-PUSCH 920. In other words, DCI-0 message 905 is an indication of an UL transmission for the UE, and the UE performs the UL transmission 910 associated with the indicated UL transmission (namely, transmission of the SRB/DRB data on NB-PUSCH 920).

After performing the associated UL transmission, "active time" 930 is started an "offset time" 935 after UL transmission 910 ends. In embodiments in which timers are used, for example, after performing the associated UL transmission 910 (the UL transmission on either of SRB/DRB in the example of FIG. 9A), the UE starts second timer 935. The duration of second timer 935 may be or comprise an offset period. For example, second timer 935 may be a HARQ-RTT timer that comprises an offset period. When second timer 935 expires, the UE starts third timer 930 corresponding to the "active time" described above. In certain embodiments, third timer 930 may be one of a drx-InactivityTimer and a DRX retransmission timer. During "active time" 930 (e.g., during the duration of third timer 930), the UE monitors DL control channel 915 (NB-PDCCH in the example of FIG. 9A). If no NB-PDCCH message is received before "active time" 930 ends (e.g., before third timer 930 expires), the UE enters DRX mode.

In the UL grant case shown in the example of FIG. 9A, however, the UE receives a second message 940 that is either a second DCI-0 message or a NACK message on DL control channel 915 before the expiration of "active time" 930 (e.g., before the expiration of third timer 930). In scenarios in which second message 940 is a NACK message, it could be an UL grant with the new data indicator (NDI) not toggled in case adaptive HARQ retransmission is used (i.e., an implicit NACK is used). Second message 940 provides an indication of a HARQ UL re-transmission 945 for the UE. Upon receiving second message 940, "active time" 930 (or, in some cases, third timer 930) is stopped and the UE stops monitoring DL control channel 915. This is because DL control channel 915 (NB-PDCCH in the example of FIG. 9A) does not need to be monitored any longer due to successful reception in the UE of second message 940 (either a second DCI-0 message or a NACK). Second message 940 triggers UL transmission activity 945 later in time (i.e., the HARQ re-transmission of UL transmission 910). In the UL grant case shown in the example of FIG. 9A, the UE performs second UL transmission 945 (namely, transmission of second SRB/DRB data on NB-PUSCH 920).

After performing second associated UL transmission 945, "active time" 950 is started "offset time" 955 after UL transmission 945 ends. In embodiments in which timers are used, for example, after performing second associated UL transmission 945 (transmission of second SRB/DRB data on NB-PUSCH 920 in the example of FIG. 9A), the UE starts second timer 955. The duration of second timer 955 may be or comprise an offset period. For example, second timer 955 may be a HARQ-RTT timer that comprises an offset period. When second timer 955 expires, the UE starts third timer 950 corresponding to the "active time" described above. In certain embodiments, third timer 950 may be one of a drx-InactivityTimer and a DRX retransmission timer. During "active time" 950 (e.g., during the duration of third timer 950), the UE monitors DL control channel 915 (NB-PDCCH in the example of FIG. 9A). If no NB-PDCCH message is received before "active time" 950 ends (e.g., before third timer 950 expires), the UE enters DRX mode 970 as shown in the example of FIG. 9A. During DRX, the previously-applied concepts apply (i.e., the UE wakes up for a period of time ("On Duration") to monitor DL control channel 915 (e.g., NB-PDCCH).

In the example of FIG. 9A, arrows 960*a-c* going from first DCI-0 message 905 and arrows 965*a-c* going from second DCI-0 message 905 are intended to illustrate that the size (e.g., duration) of "offset time" 935, "active time" 930, "offset time" 955 and "active time" 950 (or, in certain embodiments, the duration of second timers 935, 955 and third timers 930, 950 described above, respectively) may be included in first DCI-0 message 905 and second DCI-0 message 940, respectively (or relevant information to be able to determine the timer duration). In certain embodiments, these parameters may change between each scheduled transmission (e.g., between first DCI-0 message 905 and second DCI-0 message 940), allowing the parameters to be dynamically changed for every transmission. Thus, the duration of "offset time" 935 may be the same as or different than "offset time" 955. Similarly, the duration of "active time" 930 may be the same or different than "active time" 950. A network node (e.g., eNB 515 described above in relation to FIG. 5) may determine a duration of second timers 935, 955 and third timers 930, 950 described above for use by the UE to control DRX operation. The durations of second timers 935, 955 may be an amount of time that the UE waits after sending the UL transmissions 910, 945 associated with the indicated UL transmissions for the UE, respectively, before the UE starts third timers 930, 950. The duration of third timers 930, 950 may comprise an amount of time that the UE monitors DL control channel 915 before entering DRX mode. The network node may send, to the UE, information about the duration of second timers 935, 955 and third timers 930, 950 to the UE. In some cases, the durations may be different for the first UL transmission associated with first DCI-0 message 905 and second DCI-0 message 940. In certain embodiments, the durations may be the same. The various parameters (e.g., length of "offset time" 935, 955 and "active time" 930, 950 or the duration of second timers 935, 955 and third timers 930, 950 described above) may be signaled in any suitable manner. The various examples of signaling described above with respect to FIG. 6A are equally applicable to the example embodiment of FIG. 9A.

The present disclosure contemplates that the values of the various parameters may be any suitable values. In certain embodiments, the values may vary based on any suitable criteria. For example, the values of the various parameters may depend on the used UL/DL frequency resources, coding rate and number of repetitions (i.e., the redundancy), message/data size, modulation type, network node (e.g., eNB) scheduling strategy, and any other suitable criteria.

Figure 9B:
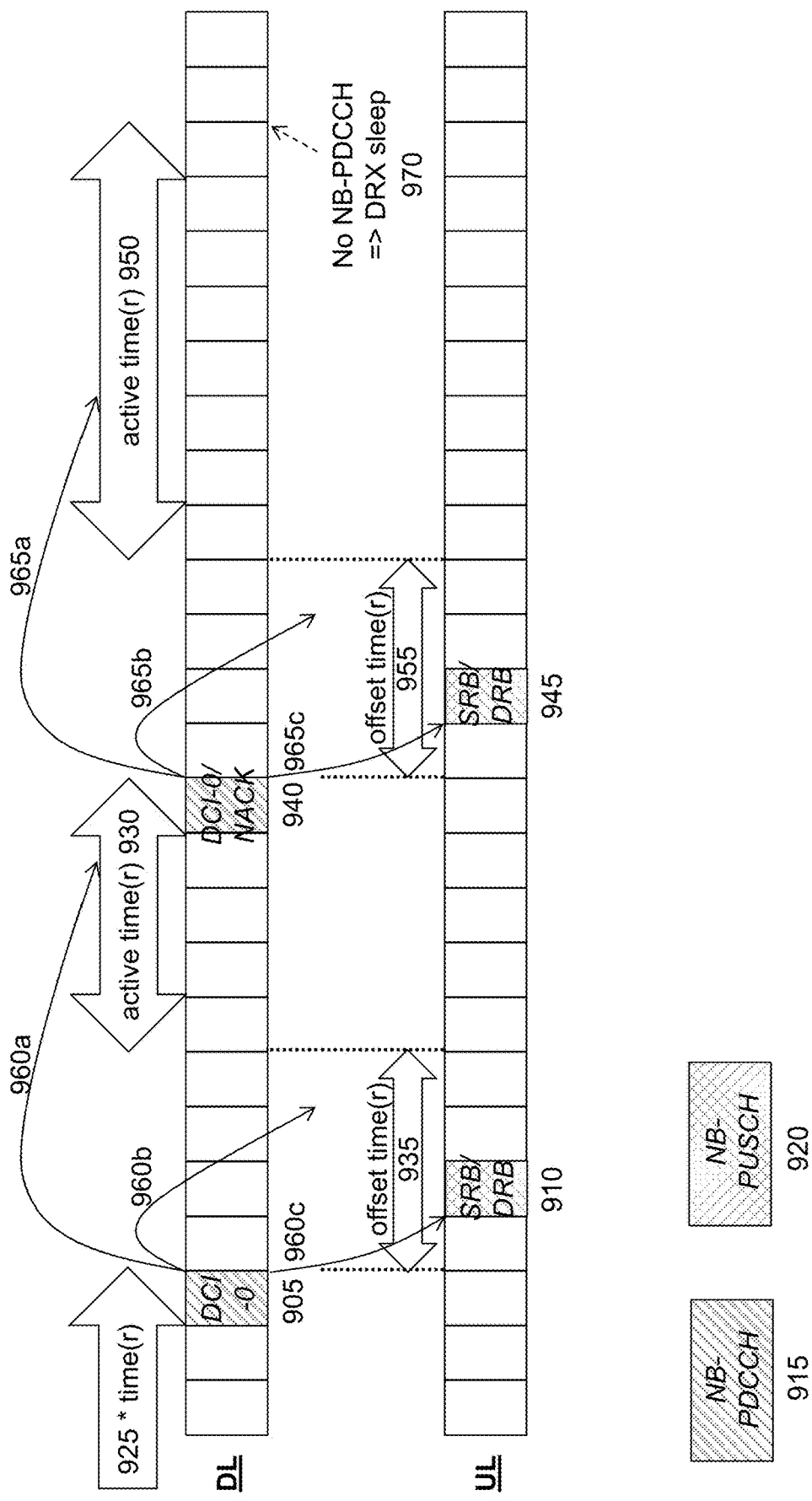
FIG. 9B illustrates a variation of the fourth example of timing and transmission for controlling DRX operations in FIG. 9A, in accordance with certain embodiments.

FIG. 9B illustrates a variation of the fourth example of timing and transmission for controlling DRX operations in FIG. 9A, in accordance with certain embodiments. FIG. 9B is similar to FIG. 9A, so only the differences will be described. In the example embodiment of FIG. 9B, "active time" 930 is started an "offset time" 935 after the end of the received indication of an UL transmission 905 for the UE received on DL control channel 915 (NB-PDCCH in the example of FIG. 9B), namely an UL grant (denoted DCI-0 in the example of FIG. 9B). In embodiments in which timers are used, for example, after the end of the received indication of UL transmission 905 for the UE, the UE starts second timer 935. The duration of second timer 935 may be or comprise an offset period. For example, second timer 935 may be a HARQ-RTT timer that comprises an offset period. When second timer 935 expires, the UE starts third timer 930 corresponding to the "active time."

Similar to FIG. 9A described above, in the example of FIG. 9B the UE receives a second message 940 that is either a second DCI-0 message or a NACK message on DL control channel 915 before the expiration of "active time" 930 (e.g., before the expiration of third timer 930). Second message 940 provides an indication of a second UL transmission 945 for the UE. Upon receiving second message 940, "active time" 930 (or, in some cases, third timer 930) is stopped and the UE stops monitoring DL control channel 915. In the example of FIG. 9B, however, "active time" 950 is started an "offset time" 955 after the end of the second received indication of an UL transmission 940 for the UE received on DL control channel 915 (NB-PDCCH in the example of FIG. 9B). In embodiments in which timers are used, for example, at the end of the second received indication of an UL transmission 940 for the UE, the UE starts second timer 955. The duration of second timer 955 may be or comprise an offset period. For example, second timer 955 may be a HARQ-RTT timer that comprises an offset period. When second timer 955 expires, the UE starts third timer 950 corresponding to the "active time."

Although the example embodiments of FIGS. 6A-9B describe DL assignments and UL grants as example of stop criteria, the present disclosure is not limited to these examples. Rather, the present disclosure contemplates the use of alternative stop criteria for the "active time," for example by sending other messages defined on the NB-PDCCH that is not a DL assignment or an UL grant. Such a message could, for example, be an "order" to enter DRX directly (applying the OnDuration/DRX-cycle). Another example could be to send new "offset time"/"active time" parameters to postpone the "active time" an "offset time" relative to the received NB-PDCCH message. This could be done to indicate to the UE that it temporarily cannot be served (e.g., due to too many UEs currently being served).

Figure 10:
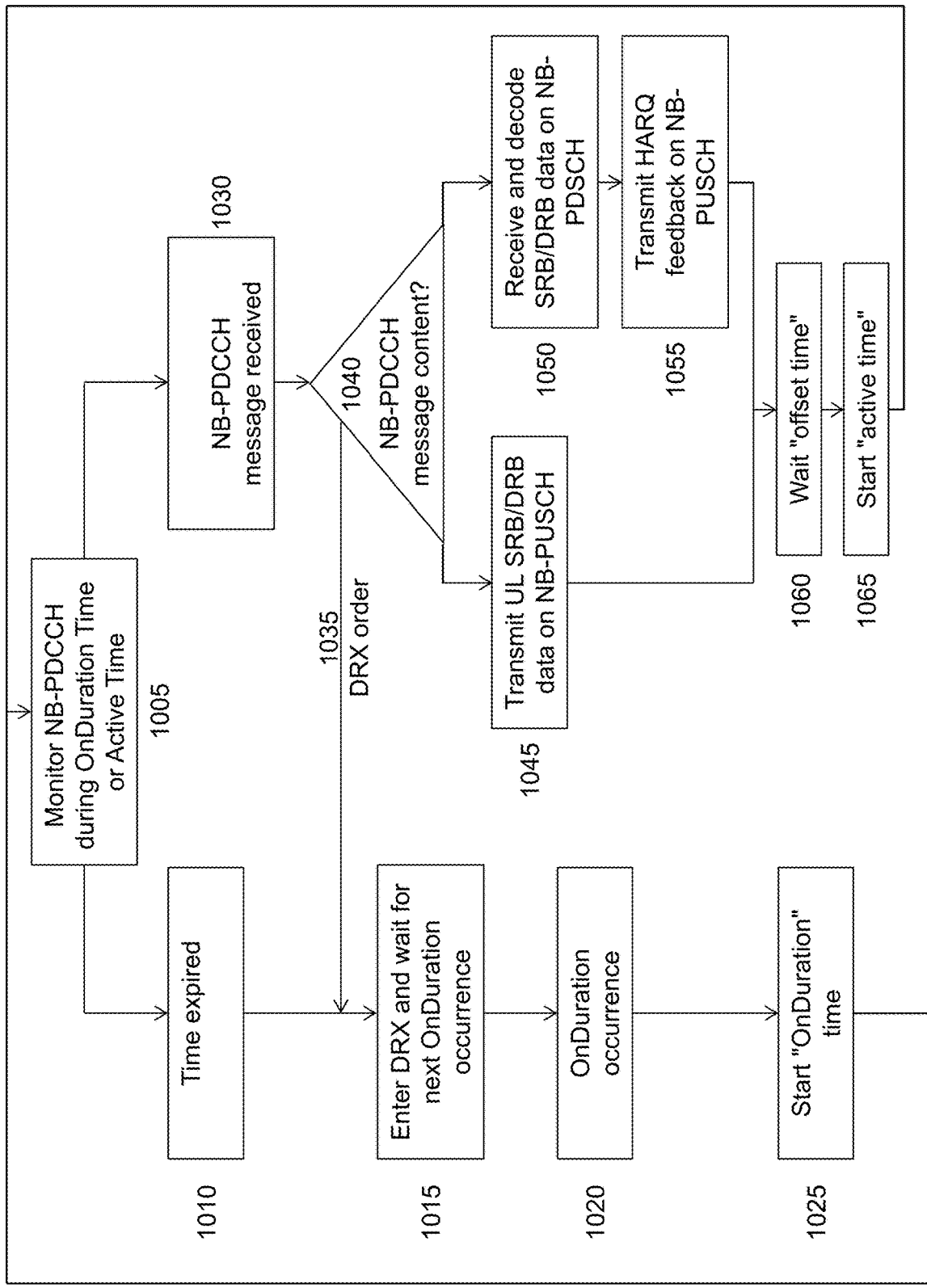
FIG. 10 is a flow chart of an example of DRX operations, in accordance with certain embodiments.

FIG. 10 is a flow chart of an example of DRX operations, in accordance with certain embodiments. At step 1005, the UE monitors the DL control channel (e.g., NB-PDCCH) during OnDuration Time or Active Time. If at step 1010 either the On Duration Time or Active Time expires, the flow proceeds to step 1015 and the UE enters DRX mode and waits for the next OnDuration occurrence. During the time the UE waits for the next OnDuration occurrence, the UE does not monitor the DL control channel. At step 1020, the next OnDuration occurrence occurs. At step 1025, the UE starts the OnDuration timer. Once the OnDuration timer is started, the flow returns to step 1005 and the UE monitors the downlink control channel (e.g., NB-PDCCH) during the OnDuration Time or Active Time.

Alternatively, during monitoring of NB-PDCCH at step 1005 the flow may proceed to step 1030 if the UE receives a message on the downlink control channel (e.g., a DL scheduling assignment or an UL grant).

In some cases, at step 1035 the NB-PDCCH message received at step 1030 may be a DRX order. In such a scenario, the flow proceeds to step 1015, where the UE enters DRX and waits for the next OnDuration occurrence. From there, the DRX operations proceed as described above.

In some cases, at step 1040 the UE determines the content of the message received on the downlink control channel. If at step 1040 the UE determines that the received message is an UL grant, the flow proceeds to step 1045 where the UE transmits UL SRB and/or DRB data on an UL shared channel (NB-PUSCH in the example of FIG. 10). Alternatively, at step 1040 the UE may determine that the received message is a DL scheduling assignment. In such a scenario, the flow proceeds to step 1050 where the UE receives and decodes SRB and/or DRB data on a DL shared channel (NB-PDSCH in the example of FIG. 10). At step 1055, the UE transmits HARQ feedback on the UL shared channel (e.g., NB-PUSCH). In certain embodiments, for example, the HARQ feedback may be an ACK message or a NACK message.

The flow then proceeds to step 1060, where the UE waits for an "offset time." In certain embodiments, the UE may start a timer. In certain embodiments, the timer may be started either after performing the associated UL transmission (for example, when the UE determines that the received message is an UL grant) or at the end of the received indication of the DL or UL transmission for the UE (for example, when the UE determines that the received message is a DL scheduling assignment). Thus, the duration of the timer may comprise an amount of time that the UE waits after sending the UL transmission at step 1045 before the UE starts an "active time" or an amount of time that the UE waits after the end of the indication of the DL or UL transmission at step 1030 before the UE starts an "active time." After waiting for the "offset time" at step 1060 (or, in certain embodiments, the timer having the duration of the offset time expires), the flow proceeds to step 1065. At step 1065, the UE starts the active time. In certain embodiments, the UE may start another timer having a duration that is an amount of time that the UE monitors the DL control channel (e.g., NB-PDCCH) before the UE enters DRX mode. After starting the active time at step 1065, the flow returns to step 1005, where the UE monitors NB-PDCCH during the duration of the "active time."

Figure 11:
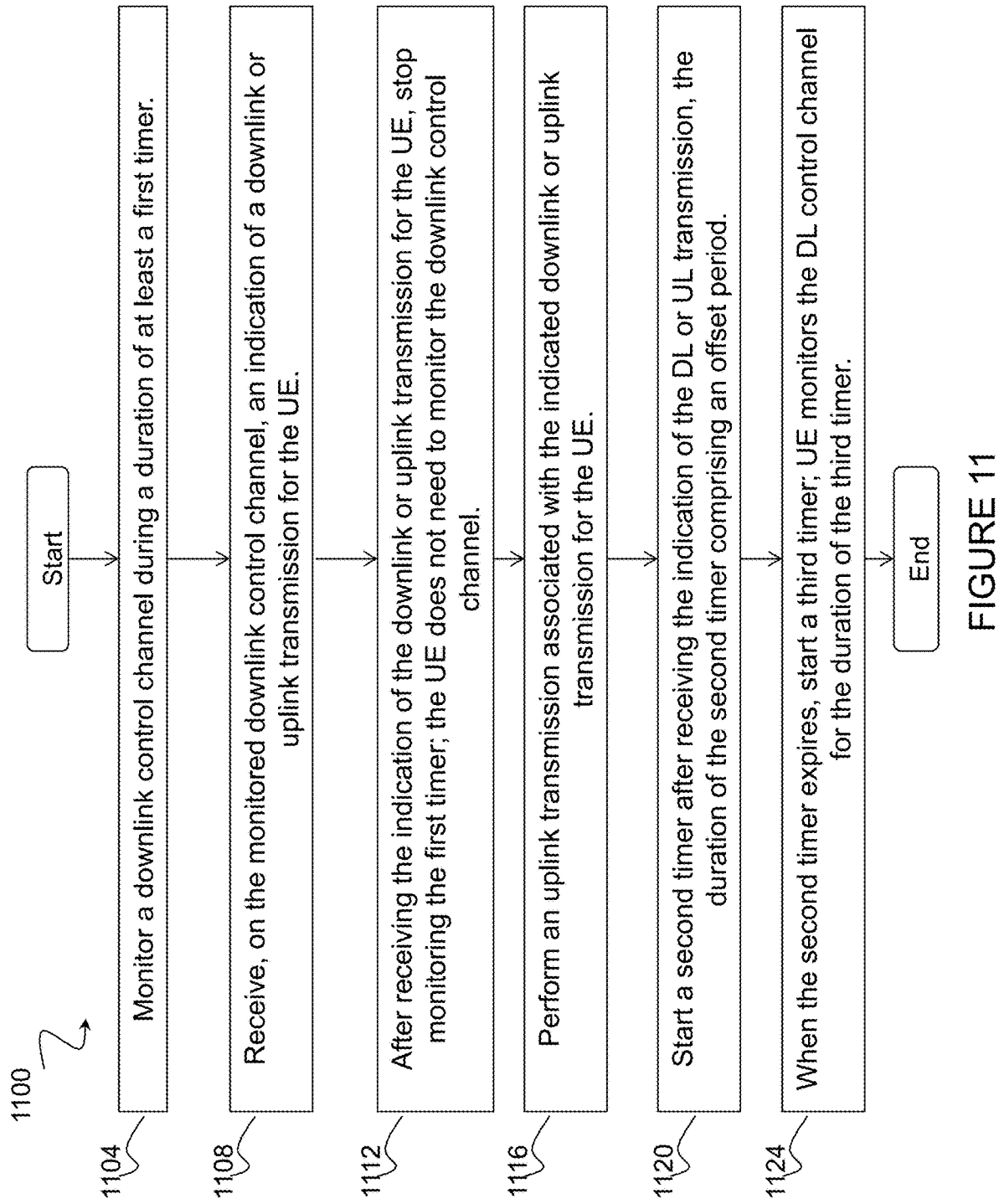
FIG. 11 is a flow diagram of a method in a UE, in accordance with certain embodiments.

FIG. 11 is a flow diagram of a method 1100 in a UE, in accordance with certain embodiments. The method begins at step 1104, where the UE monitors a DL control channel during a duration of at least a first timer. In certain embodiments, the first timer may be an onDurationTimer of a discontinuous reception cycle. In certain embodiments, the first timer may be a drx-InactivityTimer. In certain embodiments, the first timer may be a discontinuous reception retransmission timer.

At step 1108, the UE receives, on the monitored DL control channel, an indication of a DL or UL transmission for the UE. In certain embodiments, the indication of the DL or UL transmission for the UE may comprise information about a duration of at least one of the second and third timers. At step 1112, after receiving the indication of the DL or UL transmission for the UE, the UE stops monitoring the first timer. After the first timer is stopped, the UE does not need to monitor the downlink control channel.

At step 1116, the UE performs an UL transmission associated with the indicated DL or UL transmission for the UE. In certain embodiments, the indication of the DL or UL transmission for the UE may comprise a DL scheduling assignment, and the UL transmission associated with the indicated DL transmission may comprise an acknowledgement message. In certain embodiments, the indication of the DL or UL transmission for the UE may comprise an UL grant, and the UL transmission associated with the indicated UL transmission may comprise a data transmission in the UL.

At step 1120, the UE starts a second timer after receiving the indication for the downlink or uplink transmission for the UE, the duration of the second timer comprising an offset period. In certain embodiments, the second timer may be started either: after performing the associated UL transmission; or at the end of the received indication of the DL or UL transmission for the UE. In certain embodiments, the second timer may be a Hybrid Automatic Repeat reQuest (HARQ)-Round Trip Time (RTT) timer that comprises the offset period. Alternatively, at step 1120, the UE starts a second timer after receiving the indication for the downlink or uplink transmission for the UE.

At step 1124, when the second timer expires, the UE starts a third timer. In certain embodiments, the method may comprise monitoring the DL control channel during the duration of the third timer. In certain embodiments, at least one of the first timer and the third timer may be a drx-InactivityTimer. In certain embodiments, at least one of the first timer and the third timer may be a discontinuous reception retransmission timer.

In certain embodiments, the method may comprise entering a discontinuous reception mode when the third timer expires. In certain embodiments, the method may comprise receiving a message including information about a duration of at least one of the second and third timers.

Figure 12:
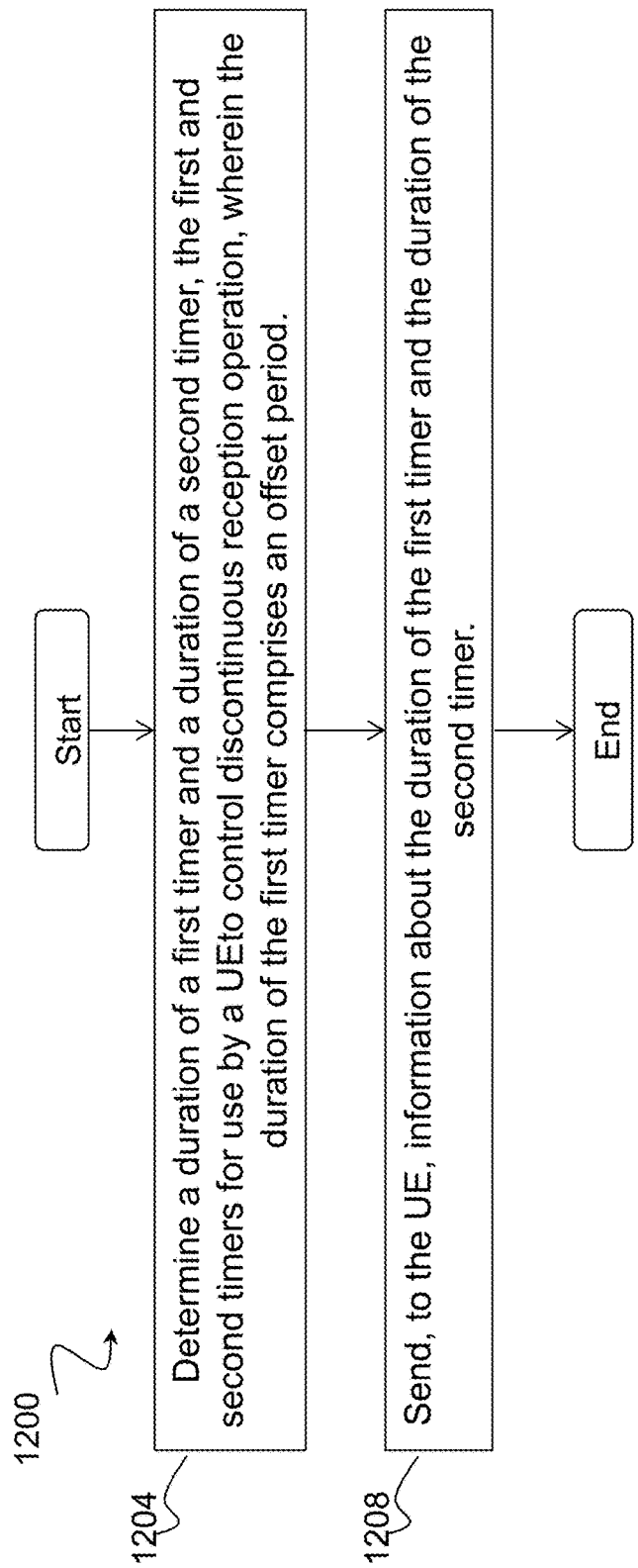
FIG. 12 is a flow diagram of a method in a network node, in accordance with certain embodiments.

FIG. 12 is a flow diagram of a method 1200 in a network node, in accordance with certain embodiments. The method begins at step 1204, where the network node determines a duration of a first timer and a duration of a second timer, the first and second timers for use by a UE to control discontinuous reception operation, wherein the duration of the first timer comprises an offset period. In certain embodiments, the duration of the first timer may comprise one of: an amount of time that the UE waits after sending the UL transmission associated with the indicated DL or UL transmission for the UE before the UE starts the second timer; and an amount of time that the UE waits after the end of the indication of the DL or UL transmission for the UE before the UE starts the second timer. In certain embodiments, the first timer may be a Hybrid Automatic Repeat reQuest (HARQ)-Round Trip Time (RTT) timer. In certain embodiments, the duration of the second timer may comprise an amount of time that the UE monitors a DL control channel before entering a discontinuous reception mode. In certain embodiments, the second timer may be a drx-Inactivity-Timer. In certain embodiments, the second timer may be a discontinuous reception retransmission timer.

At step 1208, the network node sends, to the UE, information about the duration of the first timer and the duration of the second timer. In certain embodiments, the information about the duration of the first timer and the duration of the second timer may be included in an indication of a DL or UL transmission for the UE. In certain embodiments, sending, to the UE, information about the duration of the first timer and the duration of the second timer may comprises sending a message to the UE including the information about the duration of the first timer and the duration of the second timer.

In certain embodiments, the method may comprise sending, to the UE, an indication of a DL or UL transmission for the UE, and receiving, from the UE, an UL transmission associated with the indicated DL or UL transmission for the UE. In certain embodiments, the indication of the DL or UL transmission for the UE may comprise a DL scheduling assignment, and the UL transmission associated with the indicated DL transmission may comprise an acknowledgement message. In certain embodiments, the indication of the DL or UL transmission for the UE may comprise an UL grant, and the UL transmission associated with the indicated UL transmission may comprise a data transmission in the UL. According to certain embodiments, the network node may transmit downlink control messages during the duration of the third timer. This may be beneficial when the UE stops monitoring the downlink control channel after a first timer is stopped.

Figure 13:
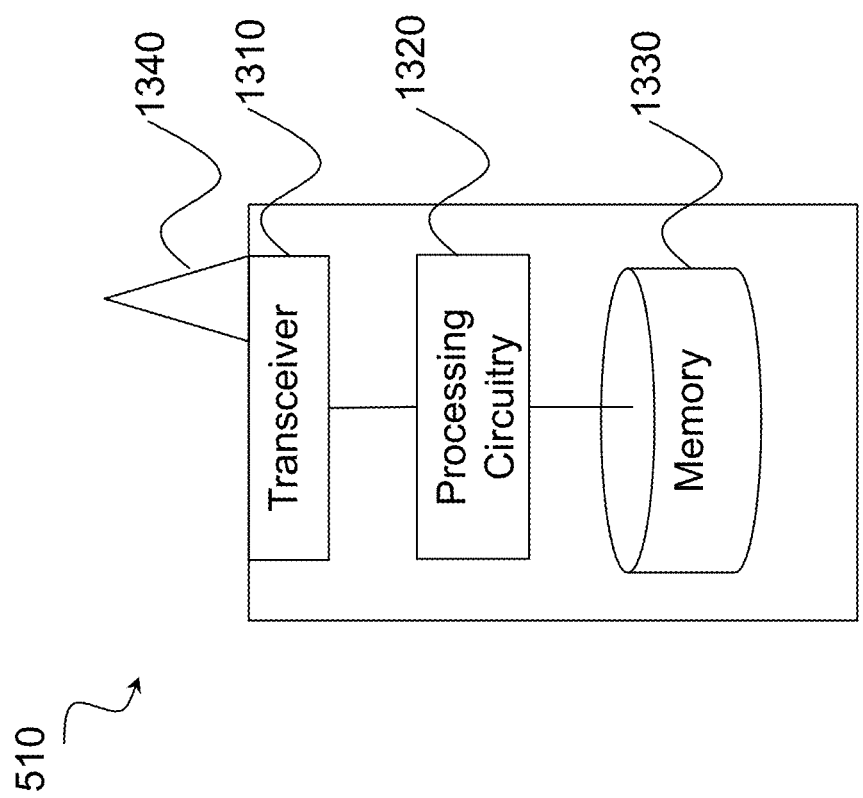
FIG. 13 is a block schematic of an exemplary UE, in accordance with certain embodiments.

FIG. 13 is a block schematic of an exemplary UE, in accordance with certain embodiments. UE 510 may refer to any type of wireless device communicating with a node and/or with another wireless device in a cellular or mobile communication system. Examples of UE 510 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. UE 510 may also be referred to as wireless device, a station (STA), a device, or a terminal in some embodiments. UE 510 includes transceiver 1310, processing circuitry 1320, and memory 1330. In some embodiments, transceiver 1310 facilitates transmitting wireless signals to and receiving wireless signals from network node 515 (e.g., via antenna 1340), processing circuitry 1320 executes instructions to provide some or all of the functionality described above as being provided by UE 510, and memory 1330 stores the instructions executed by processing circuitry 1320.

Processing circuitry 1320 may include any suitable combination of hardware and software implemented in one or more modules to execute instructions and manipulate data to perform some or all of the described functions of UE 510, such as the functions of UE 510 described above in relation to FIGS. 1-12. In some embodiments, processing circuitry 1320 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1330 is generally operable to store instructions, such as a computer program, software, an application including one or more of logic, rules, algorithms, code, tables, etc. and/or other instructions capable of being executed by a processing circuitry 1320. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1320.

Other embodiments of UE 510 may include additional components beyond those shown in FIG. 13 that may be responsible for providing certain aspects of the UE's functionality, including any of the functionality described above and/or any additional functionality (including any functionality necessary to support the solution described above). As just one example, UE 510 may include input devices and circuits, output devices, and one or more synchronization units or circuits, which may be part of the processing circuitry 1320. Input devices include mechanisms for entry of data into UE 510. For example, input devices may include input mechanisms, such as a microphone, input elements, a display, etc. Output devices may include mechanisms for outputting data in audio, video and/or hard copy format. For example, output devices may include a speaker, a display, etc.

Figure 14:
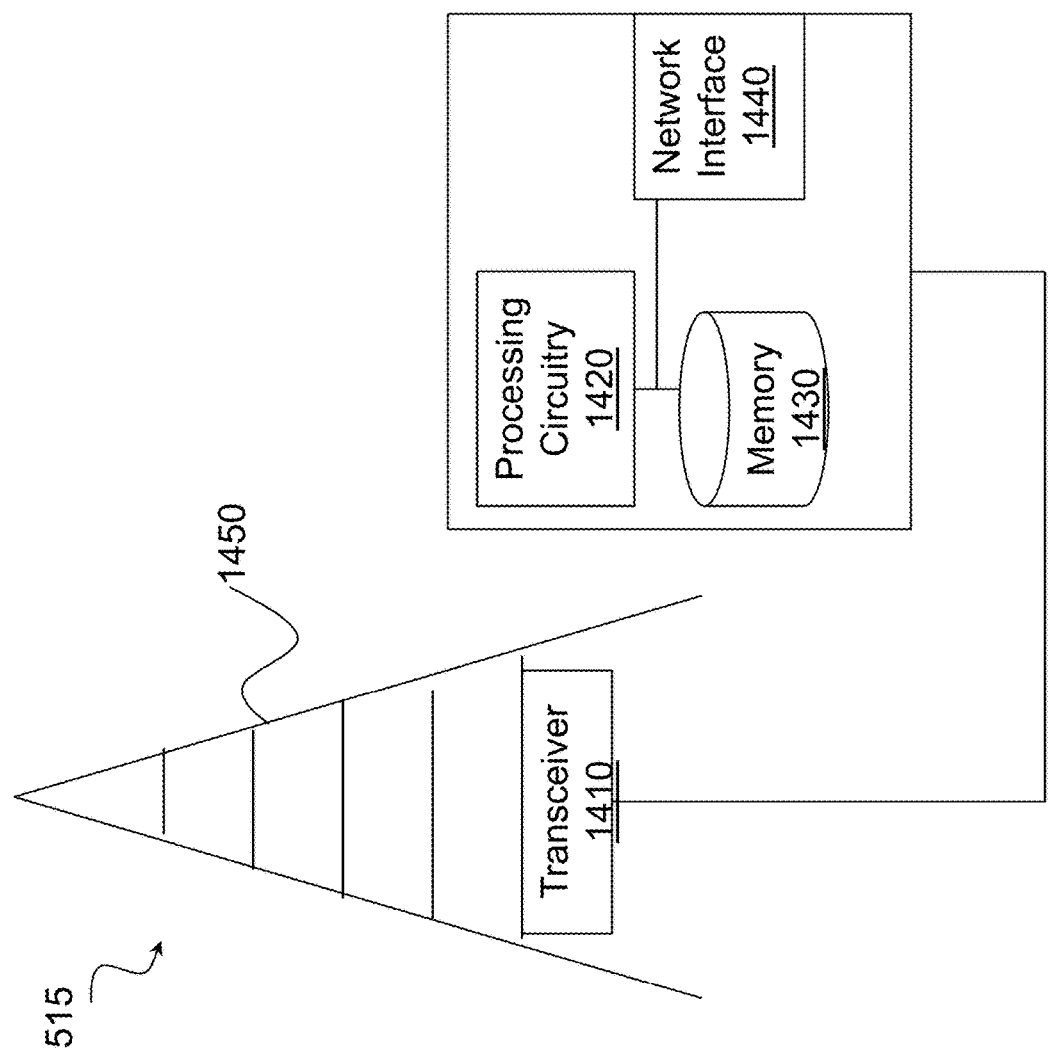
FIG. 14 is a block schematic of an exemplary network node, in accordance with certain embodiments.

FIG. 14 is a block schematic of an exemplary network node, in accordance with certain embodiments. Network node 515 may be any type of radio network node or any network node that communicates with a UE and/or with another network node. Examples of network node 515 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 515 may be deployed throughout network 500 as a homogenous deployment, heterogeneous deployment, or mixed deployment. A homogeneous deployment may generally describe a deployment made up of the same (or similar) type of network nodes 515 and/or similar coverage and cell sizes and inter-site distances. A heterogeneous deployment may generally describe deployments using a variety of types of network nodes 515 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 515 may include one or more of transceiver 1410, processing circuitry 1420, memory 1430, and network interface 1440. In some embodiments, transceiver 1410 facilitates transmitting wireless signals to and receiving wireless signals from UE 510 (e.g., via antenna 1450), processing circuitry 1420 executes instructions to provide some or all of the functionality described above as being provided by a network node 515, memory 1430 stores the instructions executed by processing circuitry 1420, and network interface 1440 communicates signals to backend network components, such as a gateway, switch, router, Internet, Public Switched Telephone Network (PSTN), core network nodes or radio network controllers 130, etc.

Processing circuitry 1420 may include any suitable combination of hardware and software implemented in one or more modules to execute instructions and manipulate data to perform some or all of the described functions of network node 515, such as those described above in relation to FIGS. 1-12 above. In some embodiments, processing circuitry 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by processing circuitry 1420. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processing circuitry 1420 and may refer to any suitable device operable to receive input for network node 515, send output from network node 515, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of network node 515 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
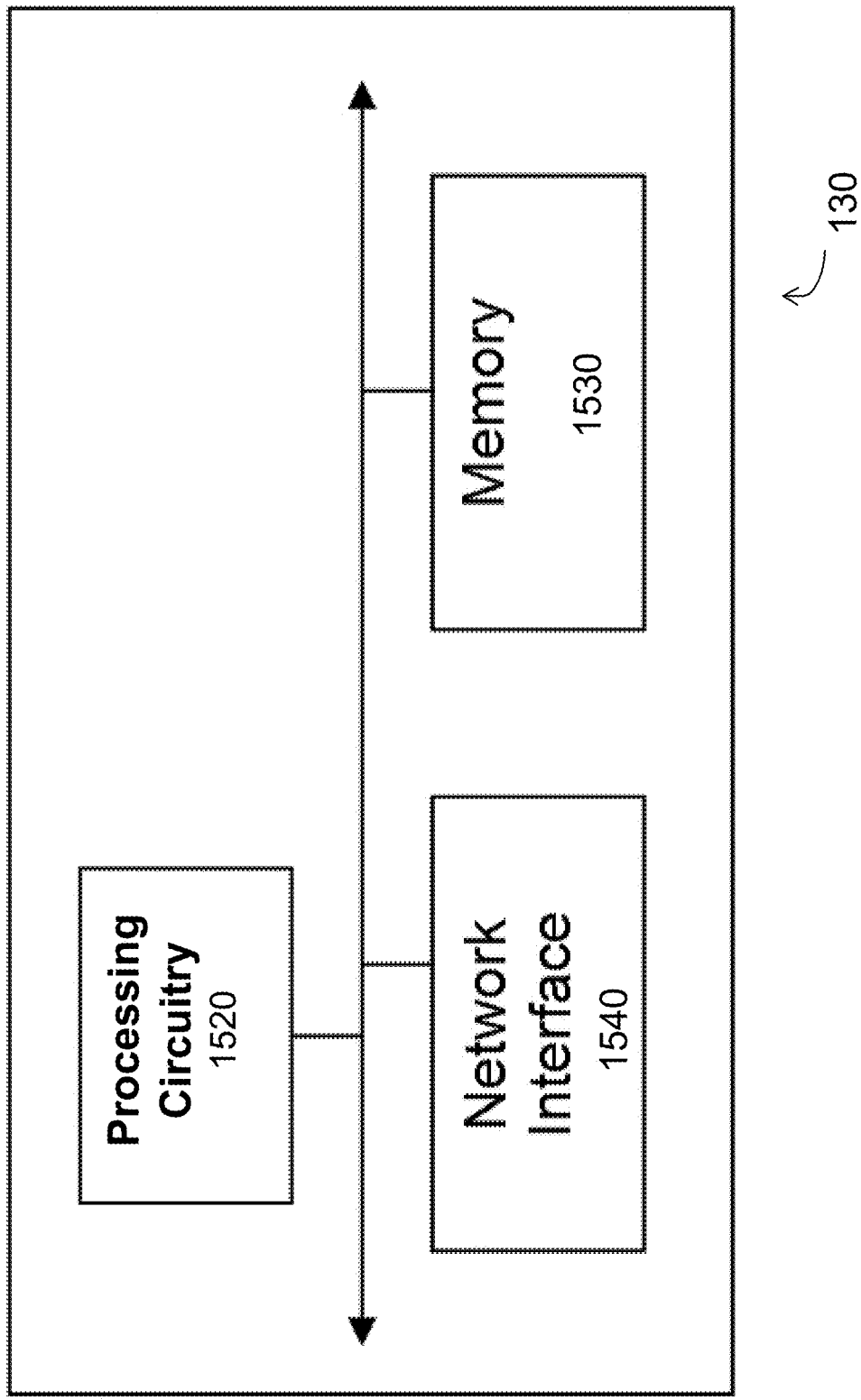
FIG. 15 is a block schematic of an exemplary radio network controller or core network node, in accordance with certain embodiments.

FIG. 15 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1520, memory 1530, and network interface 1540. In some embodiments, processing circuitry 1520 executes instructions to provide some or all of the functionality described above as being provided by the network node, memory 1530 stores the instructions executed by processing circuitry 1520, and network interface 1540 communicates signals to any suitable node, such as a gateway, switch, router, Internet, Public Switched Telephone Network (PSTN), network nodes 515, radio network controllers or core network nodes 130, etc.

Processing circuitry 1520 may include any suitable combination of hardware and software implemented in one or more modules to execute instructions and manipulate data to perform some or all of the described functions of the radio network controller or core network node 130. In some embodiments, processing circuitry 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by processing circuitry 1520. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processing circuitry 1520 and may refer to any suitable device operable to receive input for the network node, send output from the network node, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

Figure 16:
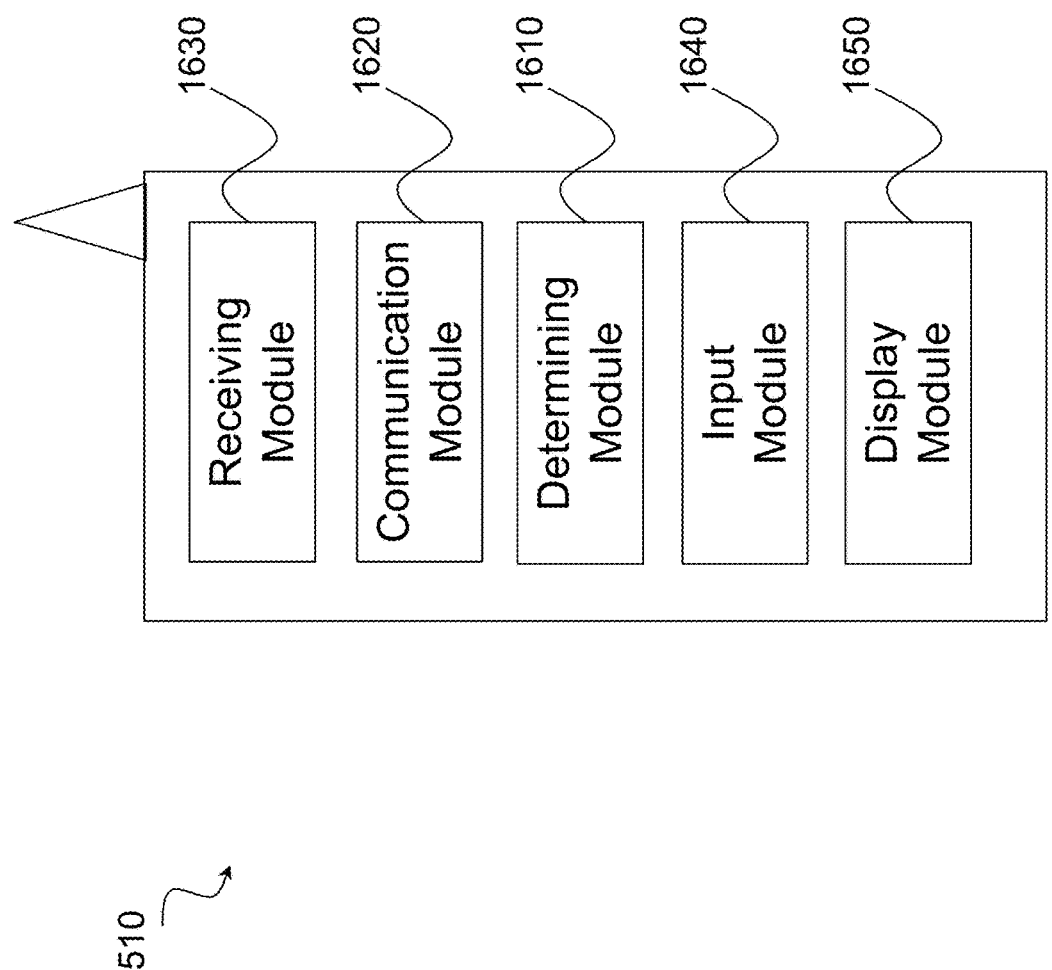
FIG. 16 is a block schematic of an exemplary UE, in accordance with certain embodiments.

FIG. 16 is a block schematic of an exemplary UE, in accordance with certain embodiments. UE 510 may include one or more modules. For example, UE 510 may include a determining module 1610, a communication module 1320, a receiving module 1630, an input module 1640, a display module 1650, and any other suitable modules. In some embodiments, one or more of determining module 1610, communication module 1620, receiving module 1630, input module 1640, display module 1650, or any other suitable module may be implemented using processing circuitry, such as such as processing circuitry 1420 described above in relation to FIG. 14. In certain embodiments, the functions of two or more of the various modules may be combined into a single module. UE 510 may perform the methods for controlling connected mode DRX operations described above with respect to FIGS. 1-12.

Determining module 1610 may perform the processing functions of UE 510. For example, determining module 1610 may monitor a DL control channel during a duration of at least a first timer. As another example, determining module 1610 may, after receiving the indication of the DL or UL transmission for the UE, stop monitoring the first timer. After the first timer is stopped, the UE does not need to monitor the downlink control channel. As still another example, determining module 1610 may start a second timer after receiving the indication for the downlink or uplink transmission for the UE, the duration of the second timer comprising an offset period. As yet another example, determining module 1610 may, when the second timer expires, start a third timer. As another example, determining module 1610 may monitor the DL control channel during the duration of the third timer. As another example, determining module 1610 may enter a discontinuous reception mode when the third timer expires.

Determining module 1610 may include or be included in one or more processors, such as processing circuitry 1320 described above in relation to FIG. 13. Determining module 1610 may include analog and/or digital circuitry configured to perform any of the functions of determining module 1610 and/or processing circuitry 1320 described above. The functions of determining module 1610 described above may, in certain embodiments, be performed in one or more distinct modules.

Communication module 1620 may perform the transmission functions of UE 510. For example, communication module 1620 may perform an UL transmission associated with the indicated DL or UL transmission for the UE. Communication module 1620 may transmit messages to one or more of network nodes 515 of network 500. Communication module 1620 may include a transmitter and/or a transceiver, such as transceiver 1310 described above in relation to FIG. 13. Communication module 1620 may include circuitry configured to wirelessly transmit messages and/or signals. In particular embodiments, communication module 1620 may receive messages and/or signals for transmission from determining module 1610. In certain embodiments, the functions of communication module 1620 described above may be performed in one or more distinct modules.

Receiving module 1630 may perform the receiving functions of UE 510. As one example, receiving module 1630 may receive, on the monitored DL control channel, an indication of a DL or UL transmission for the UE. As another example, receiving module 1630 may receive a message including information about a duration of at least one of the second and third timers. Receiving module 1630 may include a receiver and/or a transceiver, such as transceiver 1310 described above in relation to FIG. 13. Receiving module 1630 may include circuitry configured to wirelessly receive messages and/or signals. In particular embodiments, receiving module 1630 may communicate received messages and/or signals to determining module 1610. The functions of receiving module 1630 described above may, in certain embodiments, be performed in one or more distinct modules.

Input module 1640 may receive user input intended for UE 510. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1610. The functions of input module 1640 described above may, in certain embodiments, be performed in one or more distinct modules.

Display module 1650 may present signals on a display of UE 510. Display module 1650 may include the display and/or any appropriate circuitry and hardware configured to present signals on the display. Display module 1650 may receive signals to present on the display from determining module 1610. The functions of display module 1650 described above may, in certain embodiments, be performed in one or more distinct modules.

Determining module 1610, communication module 1620, receiving module 1630, input module 1640, and display module 1650 may include any suitable configuration of hardware and/or software. UE 510 may include additional modules beyond those shown in FIG. 16 that may be responsible for providing any suitable functionality, including any of the functionality described above and/or any additional functionality (including any functionality necessary to support the various solutions described herein).

Figure 17:
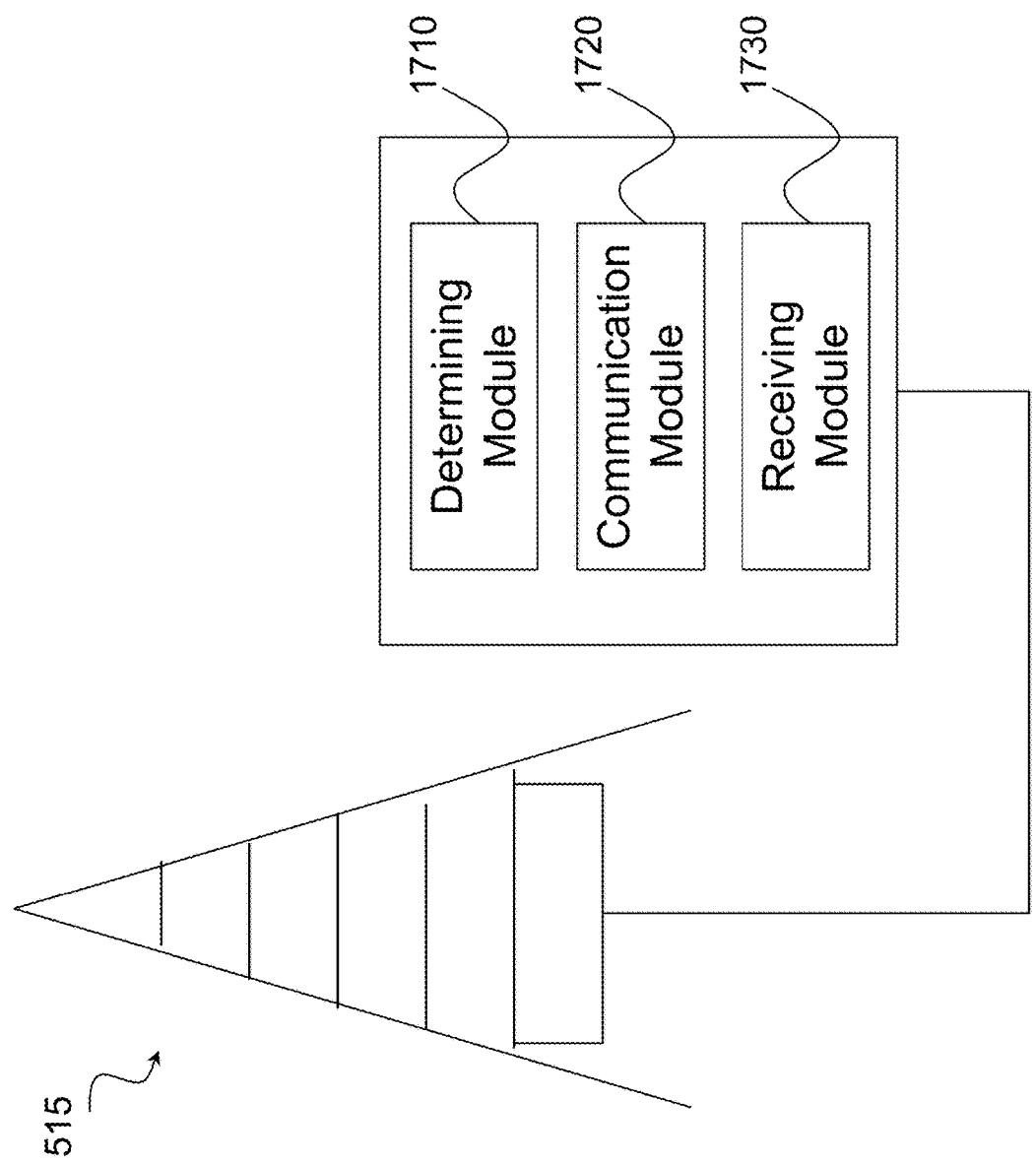
FIG. 17 is a block schematic of an exemplary network node, in accordance with certain embodiments.

FIG. 17 is a block schematic of an exemplary network node 515, in accordance with certain embodiments. Network node 515 may include one or more modules. For example, network node 515 may include determining module 1710, communication module 1720, receiving module 1730, and any other suitable modules. In some embodiments, one or more of determining module 1710, communication module 1720, receiving module 1730, or any other suitable module may be implemented using one or more processors, such as processing circuitry 1420 described above in relation to FIG. 15. In certain embodiments, the functions of two or more of the various modules may be combined into a single module. Network node 515 may perform the methods for controlling connected mode DRX operations described above with respect to FIGS. 1-12.

Determining module 1710 may perform the processing functions of network node 515. For example, determining module 1710 may determine a duration of a first timer and a duration of a second timer, the first and second timers for use by a UE to control discontinuous reception operation, wherein the duration of the first timer comprises an offset period. Determining module 1710 may include or be included in one or more processors, such as processing circuitry 1420 described above in relation to FIG. 14. Determining module 1710 may include analog and/or digital circuitry configured to perform any of the functions of determining module 1710 and/or processing circuitry 1420 described above. The functions of determining module 1710 may, in certain embodiments, be performed in one or more distinct modules.

Communication module 1720 may perform the transmission functions of network node 515. As one example, communication module 1720 may send, to the UE, information about the duration of the first timer and the duration of the second timer. As another example, communication module 1720 may send a message to the UE including the information about the duration of the first timer and the duration of the second timer. As still another example, communication module 1720 may send, to the UE, an indication of a DL or UL transmission for the UE. Communication module 1720 may transmit messages to one or more of UEs 510. Communication module 1720 may include a transmitter and/or a transceiver, such as transceiver 1410 described above in relation to FIG. 14. Communication module 1720 may include circuitry configured to wirelessly transmit messages and/or signals. In particular embodiments, communication module 1720 may receive messages and/or signals for transmission from determining module 1710 or any other module. The functions of communication module 1720 may, in certain embodiments, be performed in one or more distinct modules.

Receiving module 1730 may perform the receiving functions of network node 515. For example, receiving module 1730 may receive, from the UE, an UL transmission associated with the indicated DL or UL transmission for the UE. Receiving module 1730 may receive any suitable information from a UE. Receiving module 1730 may include a receiver and/or a transceiver, such as transceiver 1410 described above in relation to FIG. 14. Receiving module 1730 may include circuitry configured to wirelessly receive messages and/or signals. In particular embodiments, receiving module 1730 may communicate received messages and/or signals to determining module 1710 or any other suitable module. The functions of receiving module 1730 may, in certain embodiments, be performed in one or more distinct modules.

Determining module 1710, communication module 1720, and receiving module 1730 may include any suitable configuration of hardware and/or software. Network node 515 may include additional modules beyond those shown in FIG. 17 that may be responsible for providing any suitable functionality, including any of the functionality described above and/or any additional functionality (including any functionality necessary to support the various solutions described herein).

The following text provides additional explanation regarding certain embodiments and proposals described herein, and should not be seen as limiting the scope of the invention. The functionality for connected mode DRX in legacy LTE and eMTC are based on the following parameters (excluding the short DRX parameters):

onDurationTimer
drxStartOffset (signaled as longDRX-CycleStartOffset in 36.331)
longDRX-Cycle (signaled as longDRX-CycleStartOffset in 36.331)
drx-InactivityTimer
HARQ-RTT-Timer
drx-RetransmissionTimer The first three parameters can be re-used as is for NB-IoT except for the value ranges that need to be looked into further. The two last parameters are related to how the HARQ operation works. The drx-InactivityTimer parameter is used to control when the UE enters DRX after inactivity (unless a MAC CE is signaled) so the handling of this parameter will mainly be discussed. As it is already decided to support only one HARQ process per direction and if half-duplex operation for the UE is assumed changes/simplifications to these three last parameters could be discussed and made even if the details of the HARQ operations are not fully decided yet.

Due to the NB-IoT UE transmission/reception capabilities being half-duplex and having only one HARQ process per direction the handling of the DRX in-activity timer and the HARQ re-transmission timers for the connected mode DRX could be changed/simplified. Therefore, according to certain embodiments, the legacy parameters drxStartOffset, longDRX-Cycle and OnDurationTimer may be re-used as is for connected mode DRX with value ranges suitable for NB-IoT.

In the following examples it is assumed that the high level concept for HARQ operations for NB-IoT is similar to eMTC. To summarize the following is assumed:
Downlink/uplink data is scheduled by a message on the downlink control channel NB-PDCCH.
Downlink/uplink data is transmitted on the shared channels NB-PDSCH and NB-PUSCH respectively.
HARQ feedback is transmitted on the channels NB-PDCCH/NB-PUSCH.
Asynchronous HARQ is used in both downlink and uplink.

In the upcoming embodiments the DRX operations are explained by applying these HARQ assumptions. Note that the time durations of the transmissions and the offsets in-between transmissions can vary in length. According to one embodiment, we have used the legacy behavior for the DRX operation with the drx-InactivityTimer and applied it to NB-IoT. The timer is started every time there is a new transmission scheduled either in the UL or the DL on the NB-PDCCH. In this case the downlink transmission is successful and no further data is scheduled so the UE goes into DRX sleep at timer expiry.

According to another embodiment there is one HARQ retransmission in the downlink when using the legacy DRX timers in NB-IoT. The timers HARQ-RTT-Timer/drx-RetransmissionTimer are used for this and the latter is cancelled when the re-transmission is received.

Compared to legacy LTE the uplink HARQ for eMTC (and LAA) has been changed from synchronous to asynchronous. It is assumed here that there is probably a need to introduce something similar as the HARQ-RTT-Timer/drx-RetransmissionTimer also for the uplink due to the asynchronous HARQ. For NB-IoT it is assumed that such timers will be needed when discussing the legacy base for DRX. Thus, according to another embodiment, there is a HARQ retransmission in the uplink with assumed new timer. Similar to the downlink case the timer is cancelled when the UE detects that a re-transmission is scheduled. Note that we call it the drx-RetransmissionTimer even if it is not really a "Retransmission Timer" as the UE does not know the result of the transmission. This may also be referred to as a HARQ-FeedbackWindowTimer.

As discussed, the legacy DRX timers could be used also for NB-IoT. This legacy scheme was developed with Mobile Broadband use cases in mind that include multiple HARQ processes in both directions and full duplex operations (except for TDD of course). For these use cases (except for VoLTE) the UE power consumption with regards to being awake a few extra sub-frames here and there is not a problem. However, for NB-IoT it is very important that the UE active time (i.e. when monitoring NB-PDCCH) is as small as possible also during connected mode for many of its use cases in order to get a good UE battery lifetime.

One problem with the legacy approach is how to set the value of the drx-InactivityTimer:
a short value: This is good for the UE power consumption but will introduce additional latency in case there are DL HARQ re-transmissions since the timer has (probably) expired at the time the re-transmission finished and then new data must wait for the next OnDuration occasion. A drawback with introducing this additional latency is that the UE needs to be in connected mode during longer time. Additionally, long time spent in connected mode (especially if long DRX cycles are also used) might lead to risk of larger channel variations and loss of synchronization.
a long value: This is not good for the UE power consumption but does not introduce additional latency so it will be possible to schedule the UE faster in order for it to enter idle mode faster.

According to particular embodiments, a solution to the above problem would be to change drx-InactivityTimer so that it is re-started at every NB-PDCCH reception, i.e. regardless of if it is a new transmission or a re-transmission (both uplink and downlink). Then a short value of the drx-InactivityTimer could be used at the same time as no extra latency is introduced. If this is done then there is no need for any HARQ-RTT-Timer/drx-RetransmissionTimer as only one timer could be used to supervise both UL/DL re-transmissions and inactivity. This also decreases the UE complexity as only one timer is needed. According to this embodiment, the drx-InactivityTimer is re-started at the reception of any DCI on the NB-PDCCH.

According to additional embodiments, there is no need for the timers HARQ-RTT-Timer and drx-RetransmissionTimer for neither downlink nor uplink if the criterion for starting the timer drx-InactivityTimer is changed. A successful NB-PDCCH reception in the UE will be followed by an uplink transmission that contains of either SRB/DRB data (in case of an UL grant) or HARQ feedback (in case of a DL assignment). If it is assumed that a UE is not required to monitor the NB-PDCCH after being scheduled until after the transmission then additional changes to the start/re-start of the drx-InactivityTimer could be made. The timer should then be stopped at every successful reception of NB-PDCCH and be started after the end of the uplink transmission that was triggered by the NB-PDCCH message. This will enable the UE to be able to turn off its receiver (and potentially enter sleep mode) during more time occasions in connected mode especially if the time gaps in-between NB-PDCCH/NB-PDSCH/NB-PUSCH are long.

According to additional embodiments, stopping the drx-InactivityTimer at successful reception of anything on NB-PDCCH and starting it after the resulting uplink transmission (of DRB/SRB or HARQ feedback) enables the UE to reduce NB-PDCCH monitoring time and thus power consumption. Thus, according to certain embodiments, the start and stop criterion for the drx-InactivityTimer is changed for NB-IoT UEs to control connected mode DRX. According to certain embodiments, the start criterion of drx-InactivityTimer should be changed to after the NB-PUSCH transmission of the HARQ ACK or the DRB/SRB data for a downlink assignment and an uplink grant respectively. According to certain embodiments, the stop criterion of drx-InactivityTimer should be changed to when a downlink assignment or an uplink grant is received. According to certain embodiments, the HARQ-RTT-Timer and the drx-RetransmissionTimer may not be used in NB-IoT. According to certain embodiments, if the drx-InactivityTimer expires the UE does not need to monitor the NB-PDCCH until the next OnDuration occasion.

The majority of the NB-IoT use cases does not include simultaneous uplink/downlink traffic and instead most use cases rely on a request-response type of traffic pattern where an IP packet is sent in one direction followed by a response in the other (potentially repeated according to the same pattern a few times for some use cases). This traffic pattern is also true for the L3 (NAS/RRC) signaling procedures. As a consequence, after HARQ feedback or SRB/DRB data has been transmitted in the uplink by a UE there will not be any NB-PDCCH activity during at least one HARQ round trip time. During this time a NB-IoT UE could be allowed to not monitor the NB-PDCCH. Thus, according to certain embodiments, a change to the drx-InactivityTimer handling would be to not start it until an offset value after the uplink transmission.

In most use cases there is no need for a UE to monitor the NB-PDCCH until at least one roundtrip time after the end of the uplink transmission. Thus, according to certain embodiments, the start of the drx-InactivityTimer should be made at an offset value after the uplink transmission (of DRB/SRB or HARQ feedback) to enable the UE to reduce NB-PDCCH monitoring time. The value of this offset depends as described above on the roundtrip time but also on the physical layer design of the NB-PDCCH, e.g. time alignments and how the NB-PDCCH and NB-PDSCH is multiplexed. The value may even be variable depending on the physical layer design and the coverage class of the UE. According to certain embodiments, the start criterion of the drx-InactivityTimer could be set to at least a roundtrip time after the uplink transmission but the details is left FFS until more details are available from RAN1 on the downlink NB-PDCCH/PDSCH design. According to certain embodiments, semi-static connected mode DRX parameters for NB-IoT is included as part of RrcConnectionReestablish, RrcConnectionSetup, RrcConnectionResume, i.e. as part of Msg3. According to certain embodiments, the semi-static connected mode DRX parameters shall be applied directly when received in the UE.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AP Access Point
BS Base Station
BSC Base Station Controller
BTS Base Transceiver Station
CPE Customer Premises Equipment
D2D Device-to-device
DAS Distributed Antenna System
DCI Downlink Control Information
DL Downlink
DRB Data Radio Bearer
DRX Discontinuous Reception
DTX Discontinuous Transmission
eNB evolved Node B
EPDCCH Enhanced Physical Downlink Control Channel
FDD Frequency Division Duplex
HARQ Hybrid Automatic Repeat reQuest
HSPA High Speed Packet Access
IoT Internet-of-Things
LAN Local Area Network
LEE Laptop Embedded Equipment
LME Laptop Mounted Equipment
LTE Long Term Evolution M2M Machine-to-Machine
MAN Metropolitan Area Network
MCE Multi-cell/multicast Coordination Entity
MCS Modulation level and coding scheme
MIMO Multiple Input Multiple Output
MR Measurement Restriction
MSR Multi-standard Radio
NACK Negative Acknowledgement
NAS Non-Access Stratum
NB Narrowband
NB-IoT Narrowband Internet-of-Things
NB-PDCCH Narrowband Physical Downlink Control Channel
NB-PDSCH Narrowband Physical Downlink Shared Channel
NB-PUSCH Narrowband Physical Uplink Shared Channel
NPDCCH Narrowband Physical Downlink Control Channel
NPDSCH Narrowband Physical Downlink Shared Channel
NPUSCH Narrowband Physical Uplink Shared Channel
OFDM Orthogonal Frequency Division Multiplexing
PDCCH Physical Downlink Control Channel
PDSCH Physical Downlink Shared Channel
PMI Precoded Matrix Indicator
PRB Physical Resource Block
PSTN Public Switched Telephone Network
PHICH Physical Hybrid-ARQ Indicator Channel
PUSCH Physical Uplink Shared Channel
PUCCH Physical Uplink Control Channel
RB Resource Block
RI Rank Indicator
RNC Radio Network Controller
RRC Radio Resource Control
RRH Remote Radio Head
RRU Remote Radio Unit
RTT Round Trip Time
SAW Stop-and-Wait
SRB Signaling Radio Bearer
TDD Time Division Duplex
TFRE Time Frequency Resource Element
UCI Uplink Control Information
UE User Equipment
UL Uplink
WAN Wide Area Network

The invention claimed is:

1. A method in a user equipment (UE), comprising:
monitoring a physical downlink control channel (PDCCH) during a duration of at least a first timer during active time;
receiving, on the monitored PDCCH, an indication of a downlink or uplink transmission for the UE;
after receiving the indication of the downlink or uplink transmission for the UE, stopping the first timer, wherein after the first timer is stopped the UE is no longer in active time and does not need to monitor the PDCCH;
performing an uplink transmission associated with the indicated downlink or uplink transmission for the UE;
starting a second timer, after receiving the indication of the downlink or uplink transmission for the UE, the duration of the second timer comprising an offset period;
when the second timer expires, starting a third timer, wherein the third timer runs during active time and the UE monitors the PDCCH for the duration of the third timer.

2. The method of claim 1, comprising:
entering a discontinuous reception mode when the third timer expires.

3. The method of claim 1, wherein the first timer is an onDuration Timer of a discontinuous reception cycle.

4. The method of claim 1, wherein at least one of the first timer and the third timer is a drx-Inactivity Timer.

5. The method of claim 1, wherein at least one of the first timer and the third timer comprises a discontinuous reception retransmission timer.

6. The method of claim 1, wherein the second timer is a Hybrid Automatic Repeat reQuest (HARQ)-Round Trip Time (RTT) timer that comprises the offset period.

7. The method of claim 1, wherein:
the indication of the downlink or uplink transmission for the UE comprises a downlink scheduling assignment; and
the uplink transmission associated with the indicated downlink transmission comprises an acknowledgement message.

8. The method of claim 1, wherein:
the indication of the downlink or uplink transmission for the UE comprises an uplink grant; and
the uplink transmission associated with the indicated uplink transmission comprises a data transmission in the uplink.

9. The method of claim 1, wherein the indication of the downlink or uplink transmission for the UE comprises information about a duration of at least one of the second and third timers.

10. The method of claim 1, comprising receiving a message including information about a duration of at least one of the second and third timers.

11. The method of claim 1, wherein the second timer is started either:
after performing the associated uplink transmission; or
at the end of the received indication of the downlink or uplink transmission for the UE.

12. A method in a network node, comprising:
determining a duration of a first timer and a duration of a second timer, the first and second timers for use by a user equipment (UE) to control discontinuous reception operation, wherein the duration of the first timer comprises an offset period;
sending, to the UE, information about the duration of the first timer and the duration of the second timer;
sending, to the UE, an indication of a downlink or uplink transmission for the UE; and
receiving, from the UE, an uplink transmission associated with the indicated downlink or uplink transmission for the UE;
wherein the duration of the first timer comprises one of:
an amount of time that the UE waits after sending the uplink transmission associated with the indicated downlink or uplink transmission for the UE before the UE starts the second timer; and
an amount of time that the UE waits after the end of the indication of the downlink or uplink transmission for the UE before the UE starts the second timer.

13. The method of claim 12, wherein the information about the duration of the first timer and the duration of the second timer is included in the indication of a downlink or uplink transmission for the UE.

14. A user equipment (UE), comprising:
processing circuitry, the processing circuitry configured to:
- monitor a physical downlink control channel (PDCCH) during a duration of at least a first timer during active time;
- receive, on the monitored PDCCH, an indication of a downlink or uplink transmission for the UE;
- after receiving the indication of the downlink or uplink transmission for the UE, stop monitoring the first timer, wherein after the first timer is stopped, the UE is no longer in active time and does not need to monitor the PDCCH;
- perform an uplink transmission associated with the indicated downlink or uplink transmission for the UE;
- start a second timer, after receiving the indication of the downlink or uplink transmission for the UE, the duration of the second timer comprising an offset period;
- when the second timer expires, start a third timer, wherein the third timer runs during active time and the UE monitors the PDCCH for the duration of the third timer.

15. The UE of claim 14, wherein the processing circuitry is configured to:
enter a discontinuous reception mode when the third timer expires.

16. The UE of claim 14, wherein the first timer is an onDuration Timer of a discontinuous reception cycle.

17. The UE of claim 14, wherein at least one of the first timer and the third timer is a drx-Inactivity Timer.

18. The UE of claim 14, wherein at least one of the first timer and the third timer comprises a discontinuous reception retransmission timer.

19. The UE of claim 14, wherein the second timer is a Hybrid Automatic Repeat reQuest (HARQ)-Round Trip Time (RTT) timer that comprises the offset period.

20. The UE of claim 14, wherein:
the indication of the downlink or uplink transmission for the UE comprises a downlink scheduling assignment; and
the uplink transmission associated with the indicated downlink transmission comprises an acknowledgement message.

21. The UE of claim 14, wherein:
the indication of the downlink or uplink transmission for the UE comprises an uplink grant; and
the uplink transmission associated with the indicated uplink transmission comprises a data transmission in the uplink.

22. The UE of claim 14, wherein the indication of the downlink or uplink transmission for the UE comprises information about a duration of at least one of the second and third timers.

23. The UE of claim 14, wherein the processing circuitry is configured to receive a message including information about a duration of at least one of the second and third timers.

24. The UE of claim 14, wherein the processing circuitry is configured to start the second timer either:
after performing the associated uplink transmission; or
at the end of the received indication of the downlink or uplink transmission for the UE.

25. A network node, comprising:
processing circuitry, the processing circuitry configured to:
- determine a duration of a first timer and a duration of a second timer, the first and second timers for use by a user equipment (UE) to control discontinuous reception operation, wherein the duration of the first timer comprises an offset period;
- send, to the UE, information about the duration of the first timer and the duration of the second timer;
- send, to the UE, an indication of a downlink or uplink transmission for the UE; and
- receive, from the UE, an uplink transmission associated with the indicated downlink or uplink transmission for the UE;
wherein the duration of the first timer comprises one of:
- an amount of time that the UE waits after sending the uplink transmission associated with the indicated downlink or uplink transmission for the UE before the UE starts the second timer; and
- an amount of time that the UE waits after the end of the indication of the downlink or uplink transmission for the UE before the UE starts the second timer.

26. The network node of claim 25, wherein the information about the duration of the first timer and the duration of the second timer is included in the indication of a downlink or uplink transmission for the UE.

* * * * *

UNITED STATES PATENT AND TRADEMARK OFFICE
CERTIFICATE OF CORRECTION

| | | |
|---|---|---|
| PATENT NO. | : 10,798,773 B2 | Page 1 of 2 |
| APPLICATION NO. | : 15/908007 | |
| DATED | : October 6, 2020 | |
| INVENTOR(S) | : Rathonyi et al. | |

It is certified that error appears in the above-identified patent and that said Letters Patent is hereby corrected as shown below:

In the Specification

In Column 1, Line 7, delete "2017" and insert -- 2017, now Pat. No. 9,942,941 --, therefor.

In Column 1, Lines 55-56, delete "(E-PDCCH," and insert -- (E-PDCCH), --, therefor.

In Column 3, Lines 21-22, delete "OnDuration time 105," and insert -- OnDuration time 110,--, therefor.

In Column 3, Line 54, delete "OnDuration Timer 410" and insert -- OnDuration Timer 415 --, therefor.

In Column 3, Line 55, delete "OnDuration Timer 410" and insert -- OnDuration Timer 415 --, therefor.

In Column 12, Line 31, delete "how long a time the" and insert -- how long the --, therefor.

In Column 12, Line 46, delete "(e.g., NB-PDCCH)." and insert -- (e.g., NB-PDCCH)). --, therefor.

In Column 13, Line 56, delete "FIGS. 6-9." and insert -- FIGS. 6A-9B. --, therefor.

In Column 13, Line 58, delete "FIGS. 6-9" and insert -- FIGS. 6A-9B --, therefor.

In Column 13, Line 60, delete "FIGS. 6-9" and insert -- FIGS. 6A-9B --, therefor.

In Column 13, Line 66, delete "FIGS. 6-9" and insert -- FIGS. 6A-9B --, therefor.

In Column 14, Line 14, delete "NB-PUSCH 635" and insert -- NB-PUSCH 625 --, therefor.

In Column 14, Line 61, delete "(e.g., NB-PDCCH)." and insert -- (e.g., NB-PDCCH)). --, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,798,773 B2

In Column 15, Line 43, delete "20 MS." and insert -- 20 ms. --, therefor.

In Column 16, Line 8, delete "FIG. 7)" and insert -- FIG. 7A) --, therefor.

In Column 16, Line 48, delete "(e.g., NB-PDCCH)." and insert -- (e.g., NB-PDCCH)). --, therefor.

In Column 18, Line 35, delete "(e.g., NB-PDCCH)." and insert -- (e.g., NB-PDCCH)). --, therefor.

In Column 18, Lines 58-59, delete "UL transmission 850 (the NACK" and insert -- UL transmission 830 (the NACK --, therefor.

In Column 19, Line 8, delete "(e.g., NB-PDCCH)." and insert -- (e.g., NB-PDCCH)). --, therefor.

In Column 19, Line 46, delete "FIG. 6" and insert -- FIG. 6A --, therefor.

In Column 20, Line 18, delete "FIG. 9" and insert -- FIG. 9A --, therefor.

In Column 21, Line 49, delete "(e.g., NB-PDCCH)." and insert -- (e.g., NB-PDCCH)). --, therefor.

In Column 28, Line 51, delete "communication module 1320," and insert -- communication module 1620, --, therefor.

In Column 30, Lines 26-27, delete "FIG. 15" and insert -- FIG. 14 --, therefor.

In the Claims

In Column 36, Line 9, in Claim 3, delete "onDuration Timer" and insert -- onDurationTimer --, therefor.

In Column 36, Line 11, in Claim 4, delete "drx-Inactivity Timer." and insert -- drx-InactivityTimer. --, therefor.

In Column 37, Line 31, in Claim 16, delete "onDuration Timer" and insert -- onDurationTimer --, therefor.

In Column 36, Line 33, in Claim 17, delete "drx-Inactivity Timer." and insert -- drx-InactivityTimer. --, therefor.